US009699443B2

(12) United States Patent
Niu et al.

(10) Patent No.: US 9,699,443 B2
(45) Date of Patent: Jul. 4, 2017

(54) STEREOSCOPIC IMAGE DISPLAY DEVICE

(71) Applicants: Shanghai Tianma Micro-Electronics Co., Ltd., Shanghai (CN); Tianma Micro-Electronics Co., Ltd., Shenzhen (CN)

(72) Inventors: Lei Niu, Shanghai (CN); Yuhong Tao, Shanghai (CN); Zhangben Wu, Shanghai (CN); Zhihua Ling, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 57 days.

(21) Appl. No.: 14/320,057

(22) Filed: Jun. 30, 2014

(65) Prior Publication Data

US 2015/0181202 A1 Jun. 25, 2015

(30) Foreign Application Priority Data

Dec. 19, 2013 (CN) .......................... 201310703489

(51) Int. Cl.
*G02B 27/22* (2006.01)
*H04N 13/04* (2006.01)
*H04N 13/02* (2006.01)

(52) U.S. Cl.
CPC ..... *H04N 13/0404* (2013.01); *G02B 27/2214* (2013.01); *H04N 13/0257* (2013.01)

(58) Field of Classification Search
CPC ............ G02B 27/2214; G02B 27/2242; H04N 13/0404; H04N 13/0409
(Continued)

(56) References Cited

U.S. PATENT DOCUMENTS 6,377,295 B1* 4/2002 Woodgate et al. ............. 348/59
2010/0259697 A1* 10/2010 Sakamoto et al. ............. 349/15
(Continued)

FOREIGN PATENT DOCUMENTS

| CN | 102243405 A | 11/2011 |
| CN | 103278954 A | 9/2013 |
| CN | 103348687 A | 10/2013 |

OTHER PUBLICATIONS

Office Action for Chinese Application No. 201310703489.4, mailed on May 15, 2015, 9 pages total.
(Continued)

*Primary Examiner* — Audrey Y Chang
(74) *Attorney, Agent, or Firm* — Alston & Bird LLP

(57) ABSTRACT

The disclosure provides a stereoscopic image display device, including: multiple display units, the multiple display units being arranged in rows and columns, a first black matrix being disposed between adjacent rows of display units, and a second black matrix being disposed between adjacent columns of display units. The stereoscopic image display device also includes a lens sheet disposed corresponding to the multiple display units, the lens sheet being formed by multiple lined up half-cylinder lenses, and, in an X-direction, a cycle length of the half-cylinder lenses in the lens sheet being a positive even multiple of a cycle length of the display units. In the display device, X coordinate values of the multiple display units do not repeat periodically within one cycle of the lens sheet. The stereoscopic image display device according to the disclosure can solve a problem of black and white stripes, thereby improving the display effect.

13 Claims, 17 Drawing Sheets

(58) Field of Classification Search
USPC .............................. 359/463; 348/59; 349/15
See application file for complete search history.

(56) References Cited

U.S. PATENT DOCUMENTS

2013/0088672  A1      4/2013  Shin et al.
2014/0002897  A1*     1/2014  Krijn et al. ................... 359/463

OTHER PUBLICATIONS

Office Action for Chinese Application No. 201310703489.4, mailed on Jun. 15, 2015, 9 pages total.

* cited by examiner

STEREOSCOPIC IMAGE DISPLAY DEVICE

CROSS-REFERENCES TO RELATED APPLICATIONS

This application claims the benefit of priority to Chinese Patent Application No. 201310703489.4, filed with the Chinese Patent Office on Dec. 19, 2013 and entitled "STEREOSCOPIC IMAGE DISPLAY DEVICE", the content of which is incorporated herein by reference in its entirety.

FIELD OF THE INVENTION

The disclosure relates to the stereoscopic display field, and particularly to a stereoscopic image display device with improved display effect.

BACKGROUND OF THE INVENTION

The basic principle of the stereoscopic display technology is that, with parallax between human's right and left eyes, a display picture is provided to the left eye and the right eye respectively as a left picture and a right picture, and then the left picture and the right picture are mixed into a stereoscopic picture in the brain of an observer.

Conventionally, the stereoscopic display is mainly achieved by means of convex lens technology. However, a conventional stereoscopic image display device formed by a lens structure and a 2D displayer has the problem of uneven display, such as the occurrence of black and white stripes, Moire fringes and color shift. The observation to a stereoscopic image may suffer from the uneven display, or even be failed due to a serious case of the uneven display.

BRIEF SUMMARY OF THE INVENTION

The inventors of the application have found a reason for the black and white stripes generated in a stereoscopic image, which will be illustrated in the following in conjunction with FIGS. 1 and 2 by taking a lenticular stereoscopic image display device as an example. FIG. 1 is a schematic diagram of a conventional lenticular stereoscopic image display device, and FIG. 2 is a schematic sectional view of the lenticular stereoscopic image display device shown in FIG. 1.

As shown in the figures, the lenticular stereoscopic image display device includes color sub-pixel units with various colors, including red (R) sub-pixel units, green (G) sub-pixel units and blue (B) sub-pixel units. The color sub-pixel units with various colors are arranged in rows and columns, the color sub-pixel units in each row have a same color, and the rows of color sub-pixel units that have different colors are alternatively arranged. Specifically, the R sub-pixel units, the G sub-pixel units, and the B sub-pixel units are arranged into the R sub-pixel row(s), the G sub-pixel row(s) and the B sub-pixel row(s) that are alternatively arranged. A first black matrix 01 is disposed between every two adjacent row of color sub-pixel units, and a second black matrix 02 is disposed between every two adjacent column of color sub-pixel units. In the color sub-pixel unit matrix, three adjacent color sub-pixel units, i.e., one R sub-pixel unit, one G sub-pixel unit and one B sub-pixel unit, form a pixel unit 09, and a left pixel unit 09L and a right pixel unit 09R are alternatively arranged.

A lens sheet 03 is further disposed on the color sub-pixel unit matrix. The lens sheet 03 is formed by multiple elongate half-cylinder lenses 04 lined-up periodically. That is, one half-cylinder lens 04 is one cycle of the lens sheet, and one cycle of the lens sheet 03 corresponds to one row of left pixels 09L and one row of right pixels 09R, i.e., the width of one cycle of the lens sheet 03 is twice of the width of the pixel unit 09. In this way, lights from the pixel unit 09 are refracted by the lens sheet 03, so that the light from the right pixel unit 09R only arrives at the right eye and the light from the left pixel unit 09L only arrives at the left eye, and then these lights are converged stereoscopically via human's visual center to obtain stereoscopic sensation.

However, the observed points may be different as the eye position moves, the first black matrix 01 or the second black matrix 02 between the color sub-pixel units may be observed by the eyes at some positions through refraction of the lens sheet 03, so that the images at these positions are darker than the pictures at other positions. In addition, the cycle of the whole column of color sub-pixel units corresponds to the cycle of the lens sheet 03, and specifically, one cycle of the lens sheet 03 corresponds to columns, in a positive even umber, of color sub-pixel units, hence this dark state may also occur periodically, resulting in the phenomenon of dark and black stripes.

In view of this, the disclosure provides a new stereoscopic image display device. The stereoscopic image display device includes a plurality of display units arranged in rows and columns, a first black matrix is disposed between adjacent rows of display units, and a second black matrix is disposed between adjacent columns of display units. The stereoscopic image display device further includes a lens sheet disposed corresponding to the plurality of display units. The lens sheet is formed by a plurality of lined-up half-cylinder lenses. In an X-direction, a cycle length of the half-cylinder lenses in the lens sheet is a positive even multiple of a cycle length of the display units. X coordinate values of the plurality of display units do not repeat periodically within one cycle of the lens sheet. The stereoscopic image display device according to the disclosure may eliminate the black and white stripes, thereby improving the display effect.

DETAILED DESCRIPTION OF THE INVENTION

The disclosure provides a stereoscopic image display device. The stereoscopic image display device includes a plurality of display units, and the plurality of display units are arranged in rows and columns. A first black matrix is disposed between adjacent rows of display units, and a second black matrix is disposed between adjacent columns of display units. The stereoscopic image display device further includes a lens sheet disposed corresponding to the multiple display units. The lens sheet is formed by a plurality of lined-up half-cylinder lenses. In an X-direction, a cycle length of the half-cylinder lenses in the lens sheet is a positive even multiple of a cycle length of the display units. X coordinate values of the plurality of display units do not repeat periodically within one cycle of the lens sheet. For better understanding of the object, features and advantages of the disclosure, in the following particular embodiments of the disclosure will be illustrated in detail in conjunction with the drawings.

Figure 3:
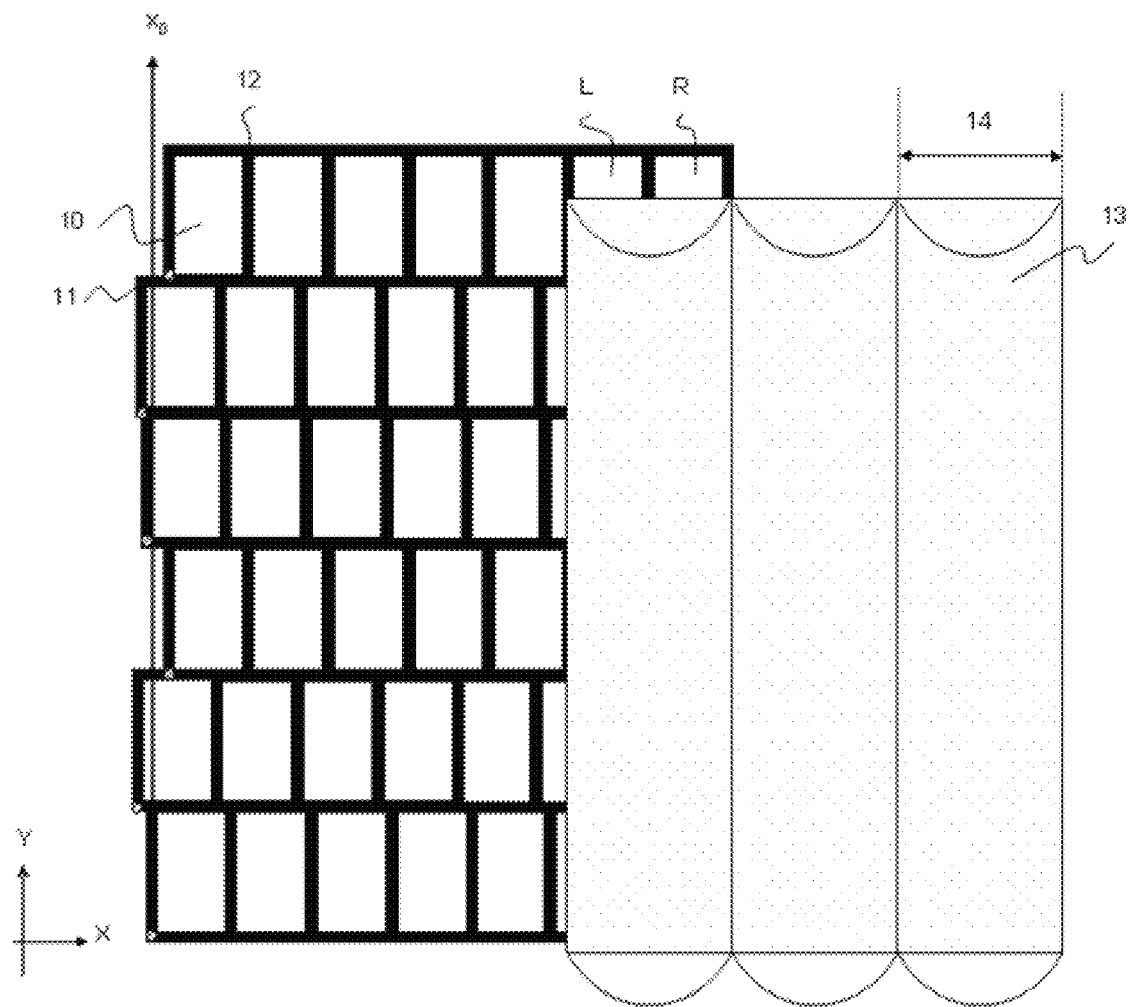
FIG. 3 shows a schematic diagram of a stereoscopic image display device according to a first embodiment.

FIG. 3 shows a stereoscopic image display device according to a first embodiment. The stereoscopic image display device includes multiple pixel units 10, and the multiple pixel units 10 are arranged in rows and columns. A first black matrix 11 is disposed between adjacent rows of pixel units, and a second black matrix 12 is disposed between adjacent columns of pixel units. That is, in the first embodiment, the display unit is embodied as the pixel unit.

The stereoscopic image display device further includes a lens sheet 13 disposed corresponding to the multiple pixel units 10. The lens sheet 13 is formed by multiple lined up half-cylinder lenses 14 periodically, that is, one half-cylinder lens 14 constitute one cycle of the lens sheet 13. The lens sheet 13 is disposed between an observation point and the multiple pixel units 10.

In the X-direction, the length of one cycle of the lens sheet 13, i.e., the length of one half-cylinder lens 14, is a positive even multiple of the length of one cycle of the pixel units 10. In the first embodiment, the length of the half-cylinder lens 14 is twice of the length of one cycle of the pixel units 10, that is, one half-cylinder lens 14 corresponds to two columns of pixel units 10, where the two columns of pixel units 10 are a left pixel L for providing an image to be observed by the left eye and a right pixel R for providing an image to be observed by the right eye, respectively. When the eyes observe at the observation point, lights from the pixel unit 10 are refracted by the lens sheet 13 in a way that the light from the right pixel R only arrives at the right eye and the light from the left pixel L only arrives at the left eye, and then these lights are converged stereoscopically via the human visual center to obtain stereoscopic sensation.

Within one cycle of the lens sheet 13, the X coordinate values of multiple pixel units 10 in the two columns do not repeat periodically. It should be noted that, the X coordinate value of one pixel unit 10 may be an X coordinate value of any point on the pixel unit 10, as long as for each pixel unit 10 the point taken for determining the X coordinate value of the pixel unit is at the same position. For convenience, one of the four vertices for a pixel unit 10 is generally utilized to determine the X coordinate value of the pixel unit 10. In the first embodiment, the X coordinate value of a pixel unit 10 is determined according to the left lower vertex of the pixel unit 10.

The expression "do not repeat periodically" means that: in the matrix of pixel units 10, on the line X=x0 where x0 is arbitrary, the left lower vertices of the pixel units 10 do not occur periodically. That is, there may be multiple points on the straight line X=x0, but the multiple points do not occur periodically.

Figure 1:
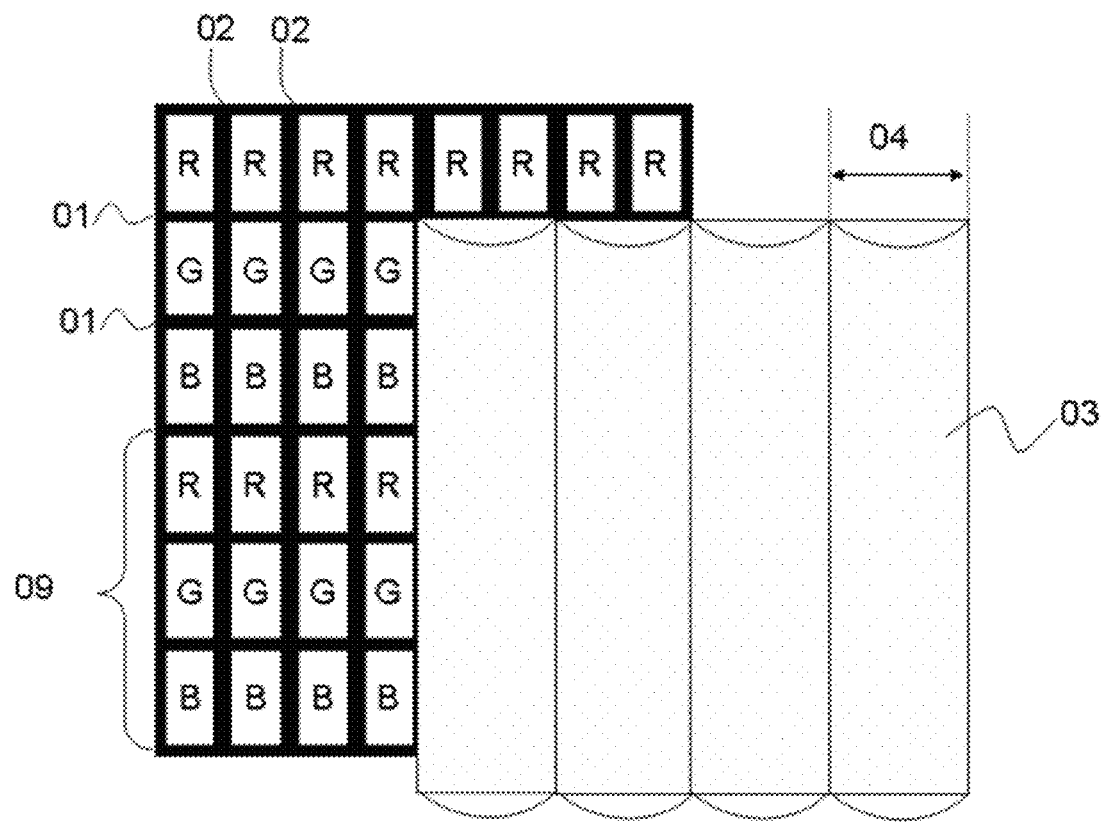
FIG. 1 is a schematic diagram of a conventional lenticular stereoscopic image display device.
Figure 2:
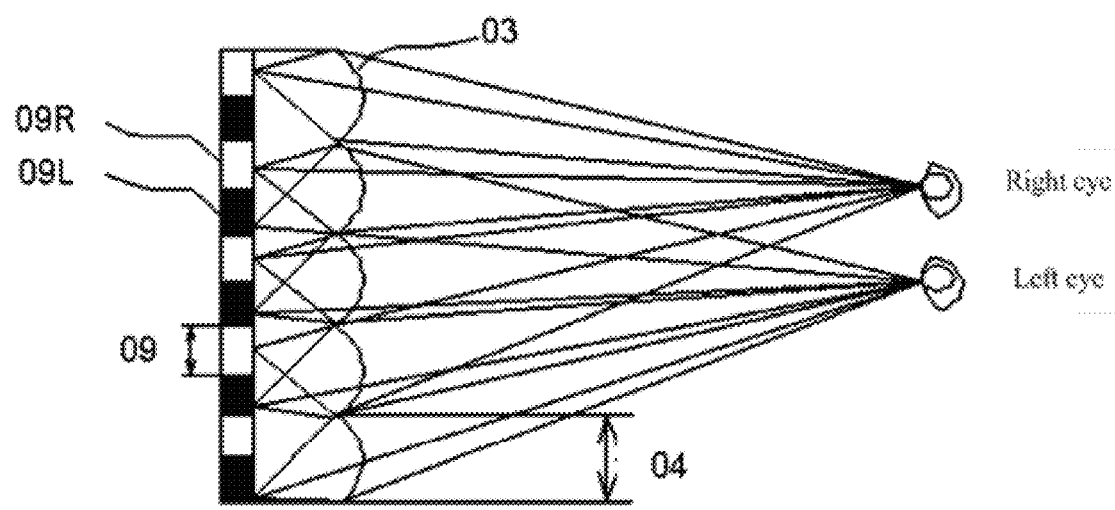
FIG. 2 is a schematic sectional view of the lenticular stereoscopic image display device shown in FIG. 1.

Referring to FIGS. 1 and 2, conventionally the X coordinate values of all the pixel units 09 in one column are the same, hence dark spots are observed in a whole cycle of the lens sheet 03 in a case where two columns of pixel units 09 that correspond to the cycle are focused on the first black matrix 01 or the second black matrix 02. Although the eyes are not sensitive to a small dark spot, a dark stripe formed by a series of dark spots will be sensed by the eyes, thereby influencing the display effect. Even if not all the dark spots in one cycle are connected to form a dark stripe, periodic occurrence of the dark spots may also be sensed by the eyes.

In the technical solution according to the first embodiment, the X coordinate values of the pixel units 10 in two columns do not repeat periodically within one cycle of the lens sheet 13. Compared with conventional technology, the X coordinate values of the multiple pixel units 10 in the two columns are shifted from each other, thereby solving the dark stripes resulted from the case that all pixel units in one column have the same or periodic X coordinate values in the conventional technology and improving the display effect.

In other embodiments, the cycle length of the half-cylinder lenses in the lens sheet may also be four times, eight times or another positive even multiple of a cycle length of the pixel units. As the multiple rises, the stereoscopic image display device may provide more viewpoints, and the user may sense a stereoscopic display effect from the multiple viewpoints. The occurrence of the dark stripe may be suppressed as along as the X coordinate values of the multiple pixel units do not repeat periodically within one cycle of the lens sheet.

Figure 4:
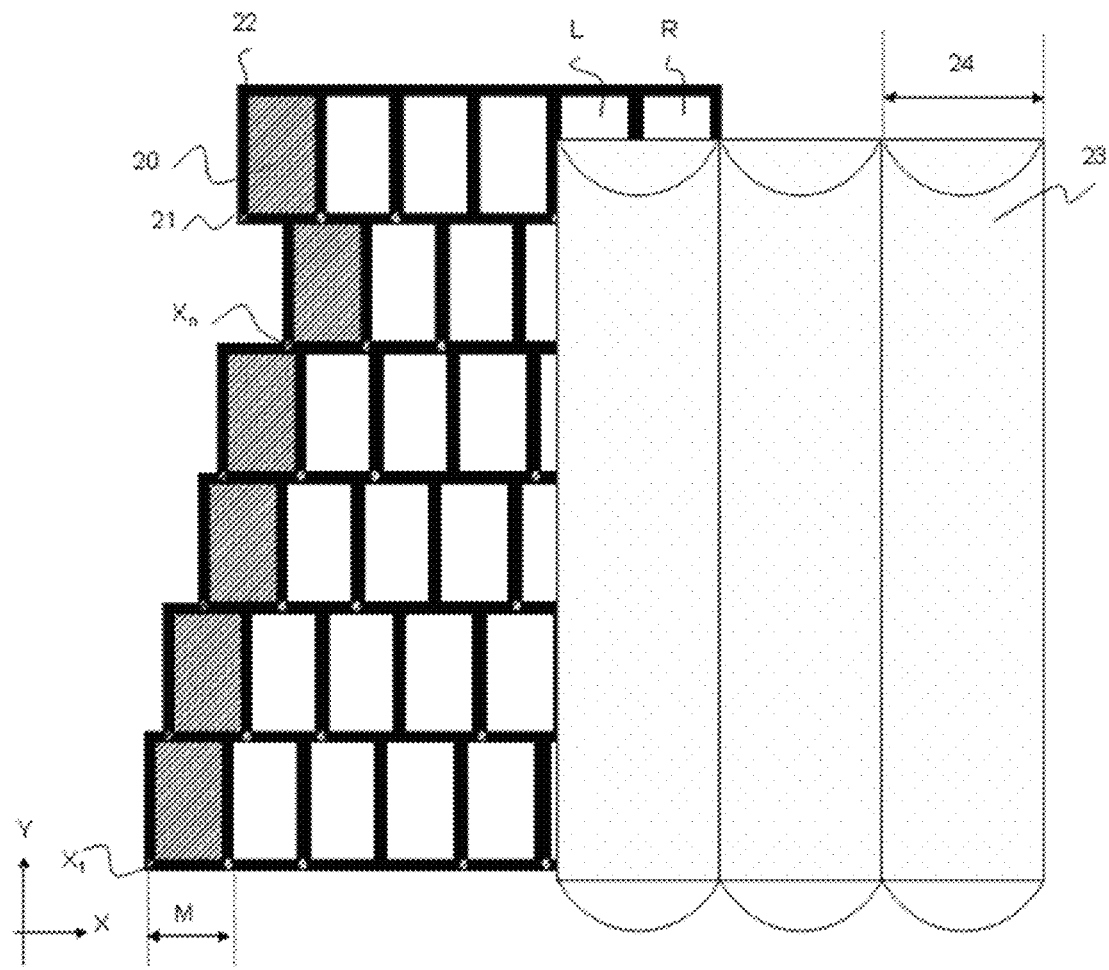
FIG. 4 shows a schematic diagram of a stereoscopic image display device according to a second embodiment.

FIG. 4 shows a stereoscopic image display device according to a second embodiment. The stereoscopic image display device includes multiple pixel units 20, and the multiple pixel units 20 are arranged in rows and columns. A first black matrix 21 is disposed between adjacent rows of pixel units, and a second black matrix 22 is disposed between adjacent columns of pixel units. That is, in the second embodiment, the display unit is embodied as the pixel unit.

The stereoscopic image display device further includes a lens sheet 23 disposed corresponding to the multiple pixel units 20. The lens sheet 23 is formed by multiple lined up half-cylinder lenses 24, that is, one half-cylinder lens 24 constitute one cycle of the lens sheet 23. The lens sheet 23 is disposed between an observation point and the multiple pixel units 20. In the X-direction, the length of one half-cylinder lens 24 in the lens sheet 23 is twice of the length of the pixel unit 20. Each column of pixel units includes multiple pixel units, the length of each pixel unit in the X-direction is M; and among the multiple pixel units, the minimum X coordinate value is $X_a$, the maximum X coordinate value is $X_b$, and $0<X_b-X_a<M$.

It is illustrated in connection with the first embodiment that an effect of suppressing occurrence of the dark stripe may be achieved as along as the X coordinate values of the multiple pixel units do not repeat periodically within one cycle of the lens sheet. There are many ways to make the X coordinate values of the multiple pixel units not to repeat periodically within one cycle of the lens sheet. For example, assuming that one cycle of the lens sheet corresponds to two columns of pixel units, each column of pixel units includes n pixel units, and the length of each pixel unit in the X-direction is M, then within one cycle of the lens sheet, there is a total number of 2n pixel units occupying a length of 2M in the X-direction. Accordingly, 2n different points may be selected within the length of 2M, and the X coordinate values of the 2n points may be taken as the X coordinate values of the pixel units in the two columns.

For convenience of design and calculation, the second embodiment provides a stereoscopic image display device in which an offset of the X coordinate value of each pixel unit in a column of pixel units with respect to the X coordinate value of a first pixel unit in the column does not exceed the length M of the pixel unit in the X-direction. That is, in one column of pixel units, if the minimum X coordinate value of the pixel unit is $X_a$ and the maximum X coordinate value of the pixel unit is $X_b$, then $0<X_b-X_a<M$.

For the above stereoscopic image display device, after the X coordinate values of the pixel units in one column are calculated, the X coordinate values of the pixel units in a next column may be obtained by adding M to the X coordinate values of the pixel units in the previous column respectively. In one column of pixel units, an offset of the X coordinate value of each pixel unit with respect to the X coordinate value of the first pixel unit in the column does not exceed the length M of the pixel unit in the X-direction. Therefore, pixel units in different columns may not have same X coordinate values, and there is no need to separately consider the X coordinate values of all pixel units within one cycle of the lens sheet, thereby reducing difficulty in design.

Further, in one column of pixel units, the X coordinate values of individual pixel units may be different from each other, or the X coordinate values of some pixel units may be the same, as long as the same X coordinate value does not occur periodically.

There are many implementations to make the X coordinate values of the multiple pixel units in each column of pixel units different from each other. In the following, several implementations to make the X coordinate values of the multiple pixel units in each column of pixel units different from each other are provided in conjunction with the drawings.

Figure 5:
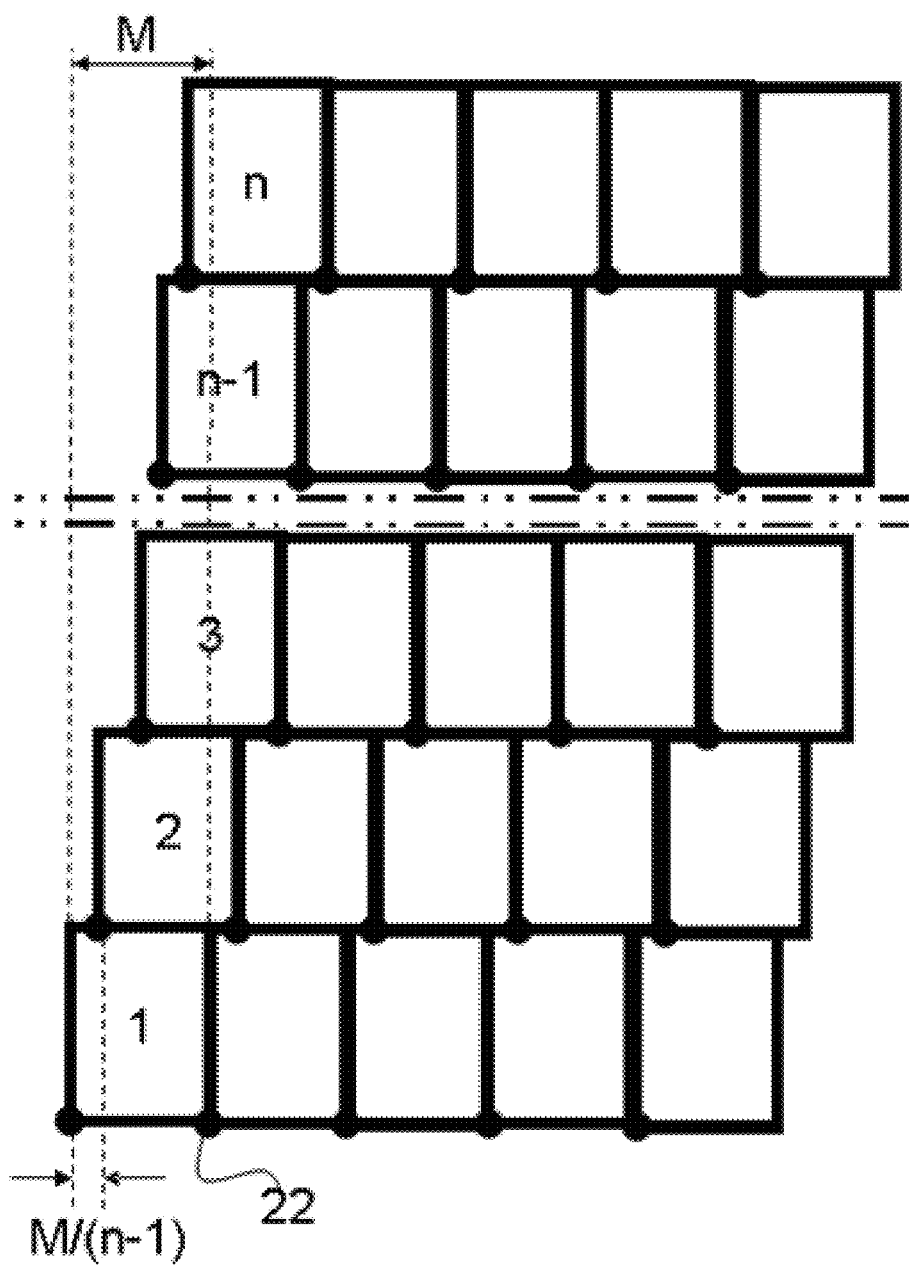
FIG. 5 is a schematic diagram of a stereoscopic image display device according to a first implementation of the second embodiment.

Reference is made to FIG. 5, which is a schematic diagram of a stereoscopic image display device according to a first implementation of the second embodiment. A stereoscopic image display device includes multiple pixel units arranged in rows and columns. Each column of pixel units includes n pixel units, which are, from bottom to top, pixel unit 1, pixel unit 2, pixel unit 3, . . . , pixel unit n−1, and pixel unit n successively. For the n pixel units in one column, there is a difference M/(n−1) between the X coordinate values of every two adjacent pixel units in the X-direction, M is the length of one pixel unit in the X-direction, and n is the number of the pixel units.

In the first implementation, the multiple pixel units are arranged into 640 rows and 480 columns, that is, the stereoscopic image display device has a resolution of VGA. Each column of pixel units includes 640 pixel units, and if the length M of each pixel unit in the X-direction is set as 180 μm, then the value of M/(n−1) is 0.28 μm. That is, for the multiple pixel units in one column of pixel units, there is a difference of 0.28 μm between the X coordinate values of every two adjacent pixel units in the X-direction. In the X-axis, the X coordinate value of the first pixel unit may be 0, the X coordinate value of the second pixel unit is 0.28 μm, the X coordinate value of the third pixel unit is 0.56 μm, . . . , the X coordinate value of the 639-th pixel unit is 178.64 μm, and the X coordinate value of the 640-th pixel unit is 178.92 μm.

The X coordinate value of each of the pixel units in one column is determined in the above manner, and the X coordinate values of all pixel units in one column are different from each other. In the next column of pixel units, the X coordinate value of each pixel unit is obtained by adding 180 μm to the X coordinate value of a pixel unit that is in the previous column and in the same row as the pixel unit. The X coordinate values of all pixel units in the 640 rows and 480 columns are different from each other.

For the stereoscopic image display device according to the first implementation of the second embodiment, the X coordinate values of individual pixel units in one column of pixel units are different, therefore the black and white stripes do not occur within one cycle of the lens sheet 23.

A second black matrix 22 is disposed between two adjacent columns of pixel units. For convenience of calculation, the length M of the pixel unit in the X-direction includes the length of one second black matrix 22 in the X-direction.

Figure 6:
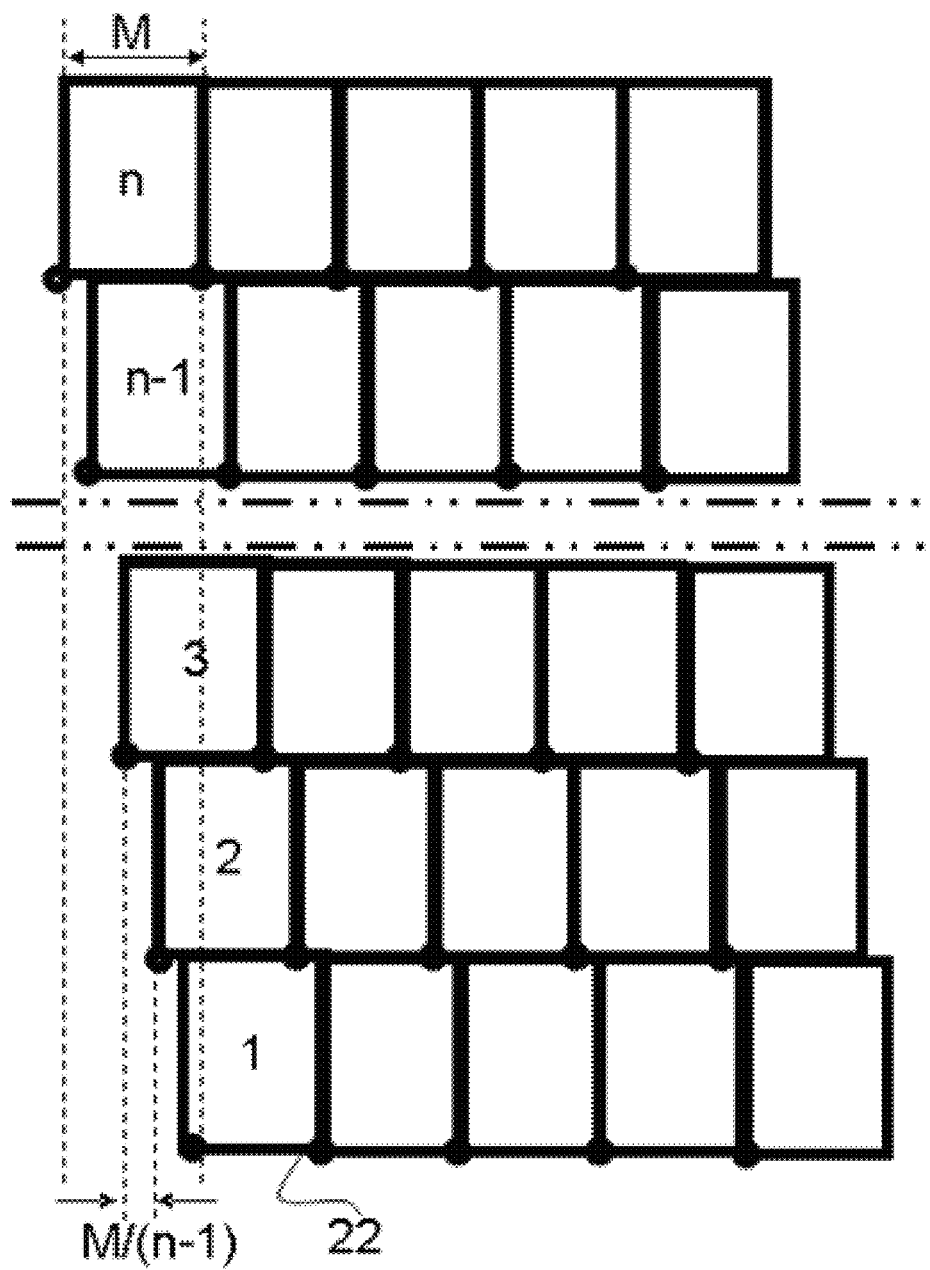
FIG. 6 is a schematic diagram showing that X coordinate values of the pixel units decrease successively as Y coordinate values of the pixel units increase successively in the first implementation of the second embodiment.

Regarding the arrangement for the pixel units, from the first pixel unit to the n-th pixel unit, the X coordinate values of the pixel units may be shifted 0.28 μm successively. As shown in FIG. 5, the Y coordinate values of the pixel units increase successively as the X coordinate values of the pixel units increase successively, so that one column of pixel units appear a trend of inclining to the upper right. As shown in FIG. 6, there may also be another case that the Y coordinate values of the pixel units decrease successively as the X coordinate values of the pixel units increase successively. That is, from the first pixel unit to the n-th pixel unit, the X coordinate values of the multiple pixel units may be shifted −0.28 μm successively, so that one column of pixel units appear a trend of inclining to the lower right. Of course, for one column of pixel units, the variation trend of the Y coordinate values may have nothing to do with the variation trend of the X coordinate values, that is, one column of pixel units are arranged randomly in the Y-direction.

Figure 7:
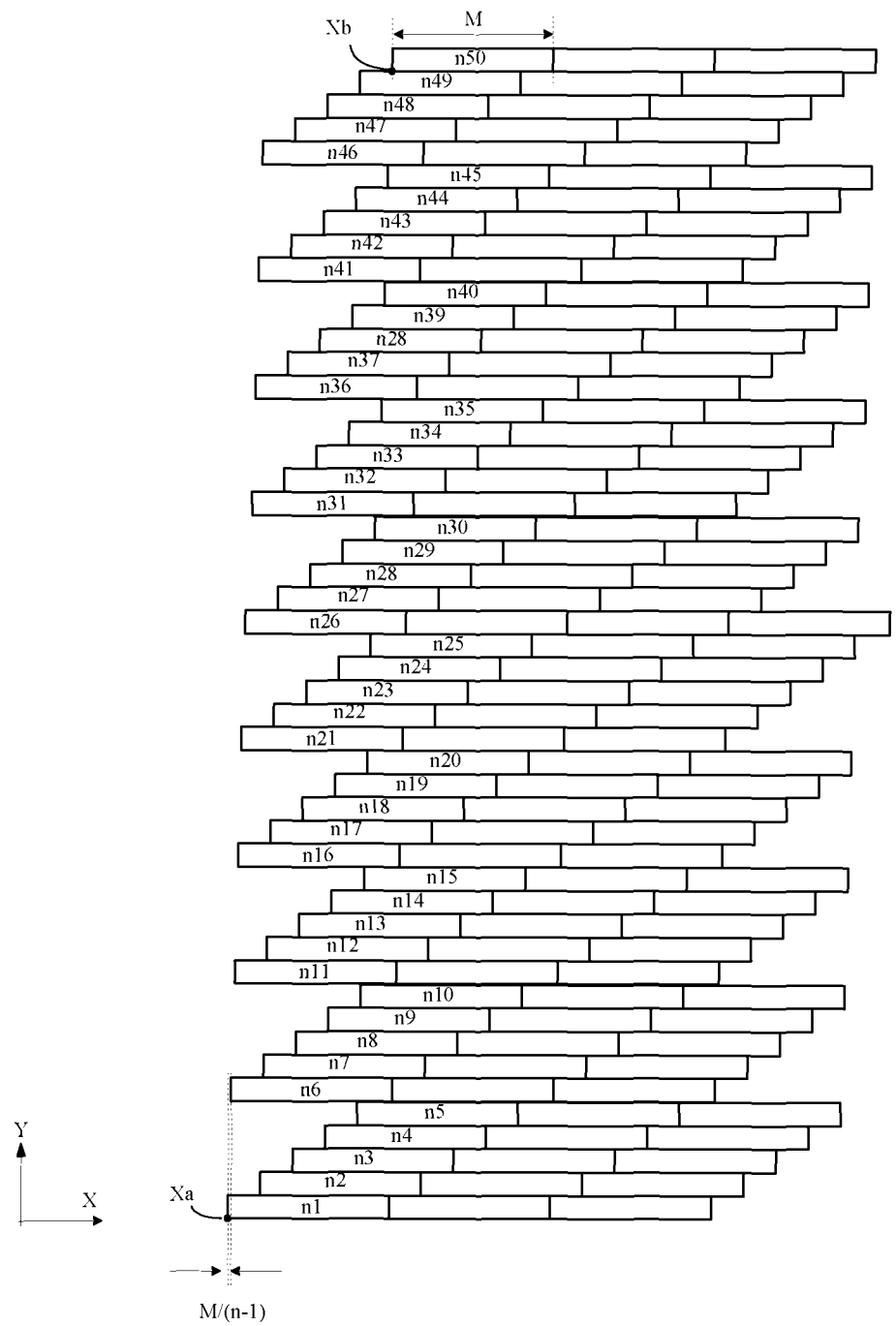
FIG. 7 is a schematic diagram of a stereoscopic image display device according to a second implementation of the second embodiment.

Reference is made to FIG. 7, which is a schematic diagram of a stereoscopic image display device according to a second implementation of the second embodiment. The second implementation differs from the first implementation in that: one column of pixel units are divided into multiple groups, the variation trends of the Y coordinate values are the same for the multiple groups of pixel units; and for the pixel units having a same order in the multiple groups, there is a difference M/(n−1) between the X coordinate values of the pixel units having the same order in every two adjacent groups. M is the length of the pixel unit in the X-direction, and n is the number of the pixel units included in one column.

Specifically, for example, it is illustrated by taking a case that a total number of 50 pixel units that are from pixel unit n1 to pixel unit n50 are divided into 10 groups as an example, 5 pixel units are included in each group. If the value of M is set as 98 μm, then M/(n−1) is 2 μm.

For the pixel units having a same order in respective groups, there is a difference of 2 μm between the X coordinate values of the pixel units having the same order in every two adjacent groups. Assuming that the X coordinate value of the first pixel unit n1 in the first group is 0, then the X coordinate value of the first pixel unit n6 in the second group is 2 μm, the X coordinate value of the first pixel unit n11 in the third group is 4 μm, the X coordinate value of the first pixel unit n16 in the fourth group is 6 μm, the X coordinate value of the first pixel unit n21 in the fifth group is 8 μm, and so on.

The variation trends of the Y coordinate values are the same for respective groups of pixel units. If the Y coordinate value increases as the X coordinate value increases for the first group of pixel units, then all the ten groups of pixel units are arranged to incline to the upper right. The X coordinate value of the second pixel unit n2 in the first group may be set as 20 μm, then the X coordinate value of the second pixel unit n7 in the second group may be 22 μm, and so on. The X coordinate values of individual pixel units are calculated in the following Table 1.

TABLE 1

| Unit (μm) | First group | Second group | Third group | Fourth group | Fifth group | Sixth group | Seventh group | Eighth group | Ninth group | Tenth group |
|---|---|---|---|---|---|---|---|---|---|---|
| first | 0 | 2 | 4 | 6 | 8 | 10 | 12 | 14 | 16 | 18 |
| second | 20 | 22 | 24 | 26 | 28 | 30 | 32 | 34 | 36 | 38 |
| third | 40 | 42 | 44 | 46 | 48 | 50 | 52 | 54 | 56 | 58 |
| fourth | 60 | 62 | 64 | 66 | 68 | 70 | 72 | 74 | 76 | 78 |
| fifth | 80 | 82 | 84 | 86 | 88 | 90 | 92 | 94 | 96 | 98 |

In conjunction with FIG. 7 and Table 1, for the five pixel units in one group, there is a difference of 20 μm between the X coordinate values of every two adjacent pixel units; and there is a difference of 78 μm between the X coordinate value of a fifth pixel unit in each group and the X coordinate value of a first pixel unit in the next group, so that one column of pixel units appear as a polyline with regular deflections.

If the pixel units are arranged according to FIG. 5 or 6, then there is only a difference of 2 μm between the X coordinate values of every two adjacent pixel units. However, in the stereoscopic image display device according to the second implementation, the difference between the X coordinate values of adjacent pixel units increases, so that the adjacent pixel units are further shifted in the X-direction.

With the development of display technology, the display resolution becomes increasingly higher, i.e., the number of the rows and the number of the columns for the pixel units become more and more, while the size of one pixel unit becomes increasingly smaller. For a stereoscopic image display device having high resolution, the shift of the X coordinate values of the pixel units in each column is hard to be implemented technically since the X coordinate values of two pixel units are very close, i.e., the two values are undistinguishable by processing equipment. Even if the technological condition is satisfied, there is still a possibility that the dark stripes may occur since the eyes may not distinguish the two points. In addition, if a whole column of pixel units are shifted in one direction, then the whole pixel unit array is in an inclined shape, bringing problems for the design of other devices, such as an enlarged area of a non-display region.

For the stereoscopic image display device according to the second implementation, one column of pixel units are divided into multiple groups, the variation trends of the Y coordinate values are the same for the multiple groups; and for the pixel units having a same order in the multiple groups, there is a difference M/(n−1) between the X coordinate values of the pixel units having the same order in every two adjacent groups. Therefore, the difference between the X coordinate values of two adjacent pixel units is increased, so that the technical implementation is easier, and it is easier for the eyes to distinguish the pixel units, thereby improving the display effect and making the stereoscopic image display device applicable for a display device with high resolution.

The X coordinate value of each of the pixel units in one column is determined in the above manner, and the X coordinate values of all pixel units in one column are different from each other. In the next column of pixel units, the X coordinate value of each pixel unit is obtained by adding M to the X coordinate value of a pixel unit that is in the previous column of pixel units and in the same row as the pixel unit. The X coordinate values of the pixel units in all columns are different from each other.

A second black matrix is disposed between two adjacent columns of pixel units. For convenience of calculation, the length M of the pixel unit in the X-direction includes the length of one second black matrix in the X-direction.

It should be noted that, although one column of pixel units are divided into multiple groups, the number of the pixel units in one group is not necessary to be the same for all the groups. For example, if there are 51 pixel units in one column of pixel units and there is a need to divide the 51 pixel units into 10 groups, then one of the groups may be set to have 6 pixel units, or other allocations may be adopted. The same technical effect may be achieved as long as each group is arranged in the above described manner.

In the following, detailed illustration of a stereoscopic image display device according to a third implementation of the first embodiment is given. A stereoscopic image display device includes pixel units arranged in rows and columns. Each column of pixel units includes n pixel units, the length of each pixel unit in the X-direction is M, and the length of each pixel unit in the Y-direction is H. In one column of pixel units, a lateral displacement $dis_x$ of the X coordinate value X' of an n'-th pixel unit with respect to the X coordinate value X1 of a first pixel unit is determined by formula 1:

$$dis_x = M \times \{(H \times n' \times F \div M) - \text{Floor}(H \times n' \times F \div M)\}, \quad \text{formula 1}$$

where 1<n'≤n,

F is a preset irrational number, and

Floor( ): is a rounding down function.

According to formula 1, a lateral displacement of the X coordinate value X2 of a second pixel unit n2 with respect to the X coordinate value X1 of the first pixel unit is:

$$dis_x = M \times \{(H \times 2 \times F \div M) - \text{Floor}(H \times 2 \times F \div M)\}$$

Assuming that the value of M is 30 μm, H is 60 μm, and F is a preset irrational number which is set as 0.08748866352 . . . herein, then the value of $dis_x$ is $dis_x=30\times\{(60\times2\times0.08748866352$ . . . $\div30)-$Floor$(60\times2\times0.08748866352$ . . . $\div30)\}=10.4986396224$ . . .

Since F is an irrational number, $(H\times n'\times F\div M)$ is also an irrational number. Being a rounding down function, Floor$(H\times n'\times F\div M)$ is an integer less than $(H\times n'\times F\div M)$. Therefore, the difference obtained by subtracting Floor$(H\times n'\times F\div M)$ from $(H\times n'\times F\div M)$ is an irrational number less than 0, and the product obtained by multiplying the difference by 30 is still an irrational number less than 30. That is, the lateral displacement of the X coordinate value X2 of the second pixel unit n2 with respect to the X coordinate value X1 of the first pixel unit is an irrational number less than 30, i.e., an offset for the second pixel unit does not exceed the length M of the first pixel unit in the X-direction.

Since F is an irrational number indicating infinite non-repeating decimals, the X coordinate values of the pixel units that are calculated according to the above formula 1 are different from each other, thereby solving the problem of black and white stripes.

Table 2 shows the X coordinate values of 49 pixel units, namely, from pixel unit n2 to pixel unit n50 in one column that are calculated according to formula 1, in which the X coordinate value X1 of the first pixel unit n1 is 0. From the calculation, the X coordinate values for the pixel unit n2 to the pixel unit n50 are irrational numbers. Considering that the process precision is within 0.001 μm, the calculation value after being rounded to 3 or 2 decimal places may be set as an actual design value for the X coordinate. The calculation results in Table 2 show that, for both the calculation values and actual values for the X coordinate, there is no repeated X coordinate value among the 50 pixel units. Therefore, the Moire fringes, resulted from the black matrixes for the multiple pixel units that are connected together, are avoided.

TABLE 2

| n' | n1 | n2 | n3 | n4 | n5 |
|---|---|---|---|---|---|
| calculation value for the X coordinate | 0 | 10.4986396224 . . . | 15.747959434 . . . | 20.997279245 . . . | 26.246599056 . . . |
| actual value for the X coordinate | 0 | 10.499 | 15.748 | 20.997 | 26.247 |
| n' | n6 | n7 | n8 | n9 | n10 |
| calculation value for the X coordinate | 1.4959188672 . . . | 6.7452386784 . . . | 11.99455849 . . . | 17.243878301 . . . | 22.493198112 . . . |
| actual value for the X coordinate | 1.496 | 6.745 | 11.995 | 17.244 | 22.493 |
| n' | n11 | n12 | n13 | n14 | n15 |
| calculation value for the X coordinate | 27.742517923 . . . | 2.9918377344 . . . | 8.2411575456 . . . | 13.490477357 . . . | 18.739797168 . . . |
| actual value for the X coordinate | 27.743 | 2.992 | 8.241 | 13.490 | 18.740 |
| n' | n16 | n17 | n18 | n19 | n20 |
| calculation value for the X coordinate | 23.989116979 . . . | 29.23843679 . . . | 4.4877566016 . . . | 9.7370764128 . . . | 14.986396224 . . . |
| actual value for the X coordinate | 23.989 | 29.238 | 4.488 | 9.737 | 14.986 |
| n' | n21 | n22 | n23 | n24 | n25 |
| calculation value for the X coordinate | 20.235716035 | 25.485035846 | 0.7343556576 | 5.9836754688 | 11.23299528 |
| actual value for the X coordinate | 20.236 | 25.485 | 0.734 | 5.984 | 11.233 |
| n' | n26 | n27 | n28 | n29 | n30 |
| calculation value for the X coordinate | 16.482315091 . . . | 21.731634902 . . . | 26.980954714 . . . | 2.2302745248 . . . | 7.479594336 . . . |
| actual value for the X coordinate | 16.482 | 21.732 | 26.981 | 2.230 | 7.480 |

TABLE 2-continued

| n' | n31 | n32 | n33 | n34 | n35 |
|---|---|---|---|---|---|
| calculation value for the X coordinate | 12.728914147 ... | 17.978233958 ... | 23.22755377 ... | 28.476873581 ... | 3.726193392 ... |
| actual value for the X coordinate | 12.729 | 17.978 | 23.228 | 28.477 | 3.726 |

| n' | n36 | n37 | n38 | n39 | n40 |
|---|---|---|---|---|---|
| calculation value for the X coordinate | 8.9755132032 ... | 14.224833014 ... | 19.474152826 ... | 24.723472637 ... | 29.972792448 ... |
| actual value for the X coordinate | 8.976 | 14.225 | 19.474 | 24.723 | 29.973 |

| n' | n41 | n42 | n43 | n44 | n45 |
|---|---|---|---|---|---|
| calculation value for the X coordinate | 5.2221122592 ... | 10.47143207 ... | 15.720751882 ... | 20.970071693 ... | 26.219391504 ... |
| actual value for the X coordinate | 5.222 | 10.471 | 15.720 | 20.970 | 26.219 |

| n' | n46 | n47 | n48 | n49 | n50 |
|---|---|---|---|---|---|
| calculation value for the X coordinate | 1.4687113152 ... | 6.7180311264 ... | 11.967350938 ... | 17.216670749 ... | 22.46599056 ... |
| actual value for the X coordinate | 1.468 | 6.718 | 11.967 | 17.216 | 22.465 |

In addition, as can be known from formula 1, the value of (H×n'×F÷M) increases as the value of n' increases, the value of {(H×2×F÷M)−Floor(H×2×F÷M)} equals to the value of the decimal part of (H×n'×F÷M). The decimal part of (H×n'×F÷M) increases gradually and then decreases, and increases gradually thereafter.

Referring to Table 2, for the 50 pixel units in one column of pixel units: from pixel unit n1 to pixel unit n5, the X coordinate values of the pixel units increase gradually, and the X coordinate value of pixel unit n6 is less than the X coordinate value of pixel unit n5; however, from pixel unit n6 to pixel unit n11, the X coordinate values of the pixel units increase gradually, indicating that the pixel units n1 to n5 form one group and the pixel units n6 to n11 form another group. Similarly, the pixel units n12 to n17 form one group, the pixel units n18 to n22 form one group, the pixel units n23 to n28 form one group, the pixel units n29 to n34 form one group, the pixel units n35 to n40 form one group, the pixel units n41 to n45 form one group, and the pixel units n46 to n50 form one group, i.e., 9 groups are formed. The X coordinate values of the pixel units increase gradually in each group.

The third implementation just provides a method for calculating the X coordinate values of multiple pixel units in one column of pixel units, and is not meant to limit the method for arranging the pixel units. The pixel units may be arranged as in FIG. 5 or 6, in which the Y coordinate values increase or decrease as the X coordinate values increase. Alternatively, the Y coordinate values vary randomly as the X coordinate values increase, as long as the X coordinate values are calculated according to formula 1.

If the Y coordinate values increase gradually as the X coordinate values increase for each group of pixel units, or the Y coordinate values decrease gradually as the X coordinate values increase for each group of pixel units, then one column of pixel units is in a shape of a polyline. Therefore, the difference between the X coordinate values of two adjacent pixel units is increased, so that the technical implementation is easier, and it is easier for the eyes to distinguish the pixel units, thereby improving the display effect and making the stereoscopic image display device applicable for a display device with high resolution.

The X coordinate value of each of the pixel units in one column is determined in the above manner, and the X coordinate values of all pixel units in one column are different from each other. In the next column of pixel units, the X coordinate value of each pixel unit is obtained by adding M to the X coordinate value of a pixel unit that is in the previous column of pixel units and in the same row as the pixel unit. The X coordinate values of the pixel units in all columns are different.

A first black matrix is disposed between two adjacent rows of pixel units, and a second black matrix is disposed between two adjacent columns of pixel units. For convenience of calculation, the length H of the pixel unit in the Y-direction includes the length of one first black matrix in the Y-direction, and the length M of the pixel unit in the X-direction includes the length of one second black matrix in the X-direction.

Figure 8:
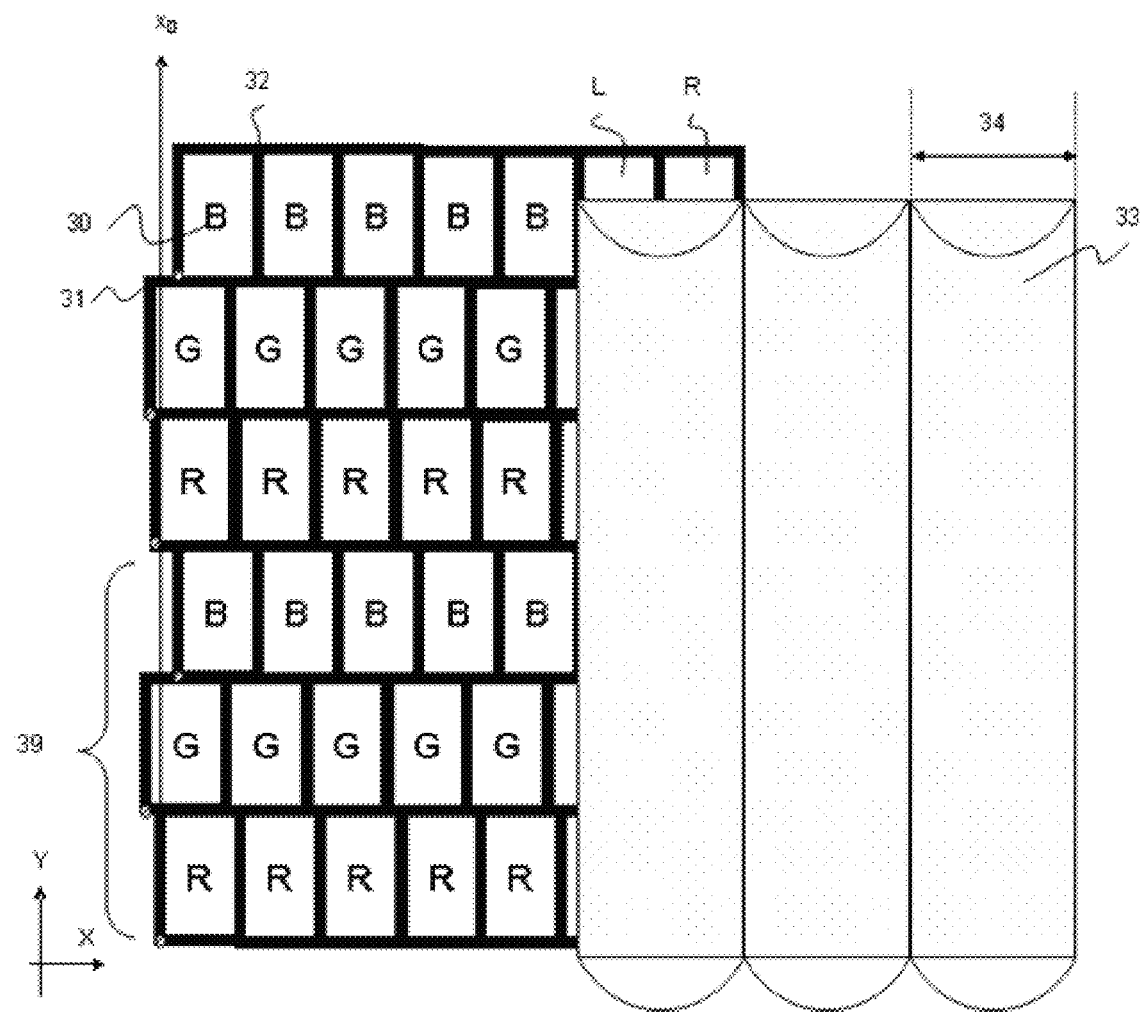
FIG. 8 is a schematic diagram of a stereoscopic image display device according to a third embodiment.

FIG. 8 shows a schematic diagram of a stereoscopic image display device according to a third embodiment. The stereoscopic image display device includes multiple color sub-pixel units 30, and the multiple color sub-pixel units 30 are arranged in rows and columns. A first black matrix 31 is disposed between adjacent rows of color sub-pixel units, and a second black matrix 32 is disposed between adjacent columns of color sub-pixel units. That is, in the third embodiment, the display unit is the color sub-pixel unit.

The color sub-pixel units 30 in one row have a same color, and the rows of color sub-pixel units that have different colors are alternatively arranged. In the third embodiment, the row of red (R) sub-pixel units, the row of green (G) sub-pixel units and the row of blue (B) sub-pixel units are alternatively arranged. Three adjacent color sub-pixel units 30 in the vertical direction, which have different colors, form one pixel unit 39. As shown in FIG. 8, one pixel unit 39 includes a R sub-pixel unit, a G sub-pixel unit and a B sub-pixel unit which are adjacent.

The stereoscopic image display device further includes a lens sheet 33 disposed corresponding to the multiple pixel units 39. The lens sheet 33 is formed by multiple lined up half-cylinder lenses. The lens sheet 33 is disposed between an observation point and the multiple pixel units 39. In the X-direction, a cycle length 34 of the half-cylinder lenses in the lens sheet is a positive even multiple of a cycle length of the pixel units 39. In the third embodiment, the cycle length of the half-cylinder lenses is twice of a cycle length of the pixel units 39, that is, the length of one half-cylinder lens is equal to the length of two pixel units 39. As can be seen from the drawings, since three adjacent color sub-pixel units 30 in the vertical direction form one pixel unit 39, the length of the pixel unit 39 in the X-direction is the same as the length of the color sub-pixel unit 30 in the X-direction.

This embodiment differs from the first embodiment in that: within one cycle of the lens sheet, the X coordinate values of the color sub-pixel units 30 in the two columns do not repeat periodically. It should be noted that, the X coordinate value of one color sub-pixel unit 30 may be the X coordinate value of any point on the color sub-pixel unit 30, as long as for each color sub-pixel unit 30 the point taken for determining the X coordinate value of color sub-pixel unit is at a same position. For convenience, one of the four vertices for a color sub-pixel unit 30 is generally utilized to determine the X coordinate value of the color sub-pixel unit 30. In the third embodiment, the X coordinate value of a color sub-pixel unit 30 is determined according to the left lower vertex of the color sub-pixel unit 30.

The expression "do not repeat periodically" means that: in the matrix of color sub-pixel units 30, on the line X=x0 where x0 is arbitrary, the left lower vertices of the color sub-pixel units 30 do not occur periodically. That is, there may be multiple left lower vertices of the color sub-pixel units 30 on the straight line X=$X_0$, but the multiple vertices do not occur periodically.

Figure 9A:
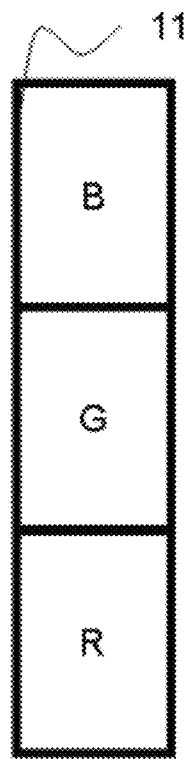
FIGS. 9A and 9B are a schematic diagrams showing difference between the technical solution in the first embodiment and the technical solution in the third embodiment.
Figure 9B:
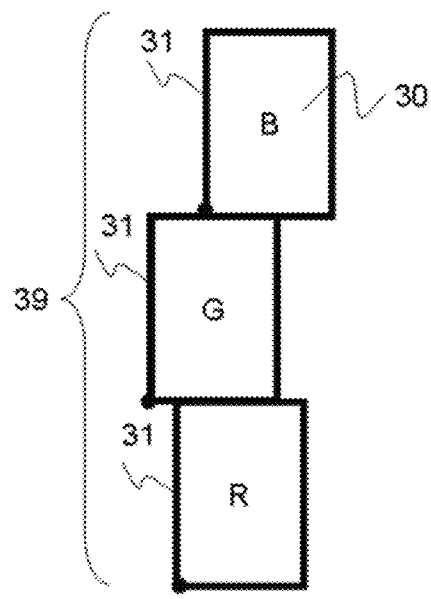

Reference is made to FIGS. 9A and 9B, which show difference between the technical solution in the first embodiment and the technical solution in the third embodiment. FIG. 9A is a schematic diagram showing the technical solution in the first embodiment, and FIG. 9B is a schematic diagram showing the technical solution in the third embodiment. In the first embodiment, the X coordinate values of the multiple pixel units 11 are set not to occur periodically; and in the third embodiment, the X coordinate values of three color sub-pixel units 30 in one pixel unit 39 are set not to occur periodically.

As shown in FIG. 9A, one pixel unit includes three color sub-pixel units, i.e., a R sub-pixel unit, a G sub-pixel unit and a B sub-pixel unit. If the X coordinate values of the three color sub-pixel units are the same, then the first black matrixes 11 on the same side of the three color sub-pixel units, i.e., the R sub-pixel unit, the G sub-pixel unit and the B sub-pixel unit, will be connected together, resulting in a high possibility of occurrence of the dark stripes in the stereoscopic display. In the third embodiment, the X coordinate values of the three color sub-pixel units 30 in one pixel unit 39 are set not to occur periodically, that is, the three color sub-pixel units, i.e., the R sub-pixel unit, the G sub-pixel unit and the B sub-pixel unit, are arranged in a staggered mode, so that the first black matrixes 31 on the same side are not on a same line, thereby further reducing the possibility of occurrence of the dark stripes.

There are also many ways to set the X coordinate values of the multiple color sub-pixel units 30 in the two columns not to repeat periodically within one cycle of the lens sheet 33. For example, assuming that in one column of color sub-pixel units, the length of each color sub-pixel unit in the X-direction is M and among the column of color sub-pixel units, the minimum X coordinate value of the color sub-pixel unit is $X_a$ and the maximum X coordinate value of the color sub-pixel unit is $X_b$, then $0 \leq X_b - X_a \leq M$. That is, one column of color sub-pixel units are shifted within the length M of one color sub-pixel unit in the X-direction. Specific implementations may refer to the three implementations of the second embodiment, and in the following, each implementation will be illustrated in detail in conjunction with the drawings.

Figure 10:
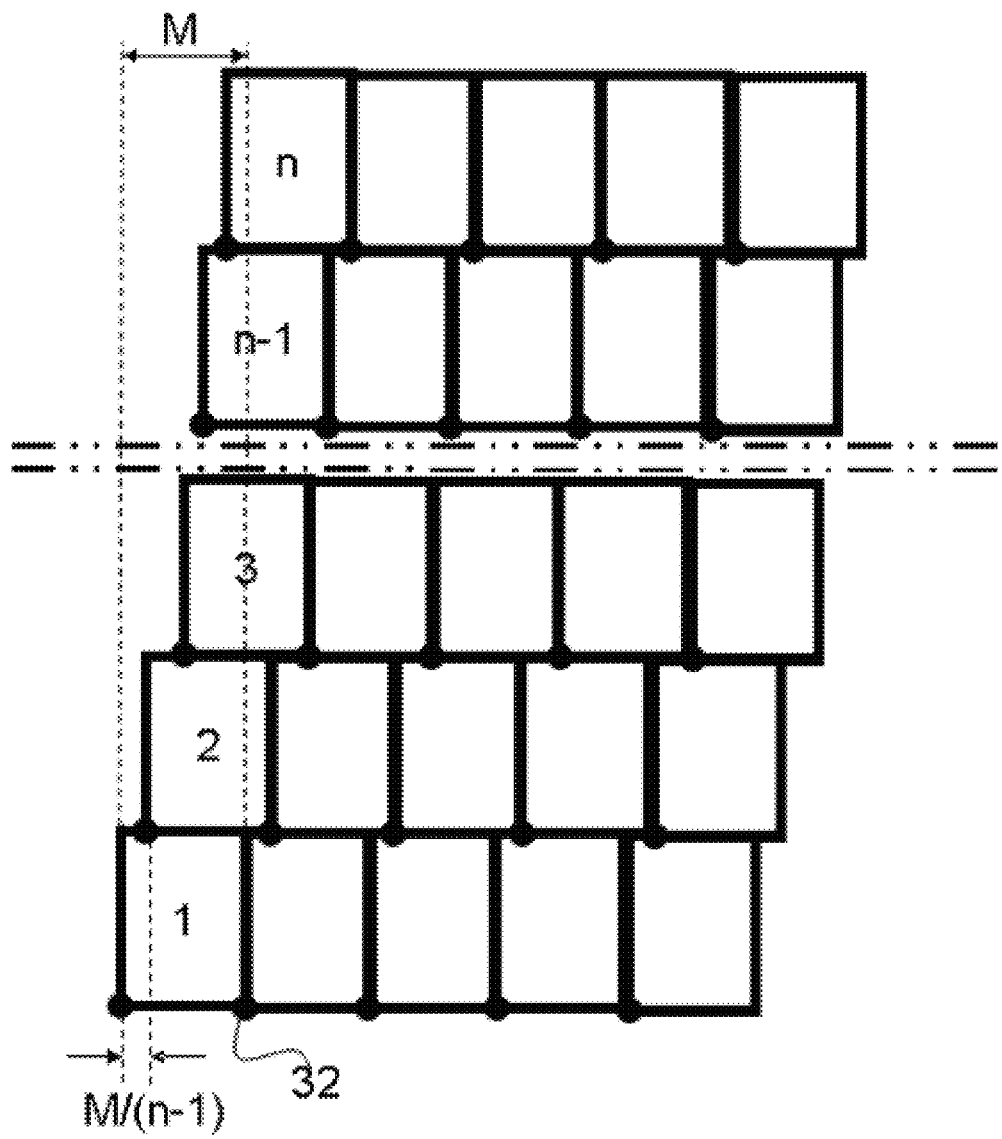
FIG. 10 is a schematic diagram showing a first implementation of the third embodiment.

FIG. 10 is a schematic diagram showing a first implementation of the third embodiment. Each column of color sub-pixel units includes n color sub-pixel units, which are, from bottom to top, color sub-pixel unit 1, color sub-pixel unit 2, color sub-pixel unit 3, . . . , color sub-pixel unit n−1, and color sub-pixel unit n successively. For the multiple color sub-pixel units in one column, there is a difference of M/(n−1) between the X coordinate values of every two adjacent color sub-pixel units in the X-direction, where M is the length of one color sub-pixel unit in the X-direction, and n is the number of the color sub-pixel units.

The X coordinate value of each of the color sub-pixel units in one column is determined in the above manner, and the X coordinate values of all color sub-pixel units in one column are different. In the next column of color sub-pixel units, the X coordinate value of each color sub-pixel unit is obtained by adding M to the X coordinate value of a color sub-pixel unit that is in the previous column and in the same row as the color sub-pixel unit. The X coordinate values of the color sub-pixel units in all rows and columns are different from each other, therefore the black and white stripes do not occur within one cycle of the lens sheet.

A second black matrix 32 is disposed between two adjacent columns of color sub-pixel units. For convenience of calculation, the length M of the color sub-pixel unit in the X-direction includes the length of one second black matrix 32 in the X-direction.

Regarding the arrangement for the color sub-pixel units, from the first color sub-pixel unit to the n-th color sub-pixel unit, the X coordinate values of the color sub-pixel units may be shifted M/(n−1) successively. That is, the Y coordinate values of the color sub-pixel units increase successively as the X coordinate values of the color sub-pixel units increase successively, so that one column of color sub-pixel units appear a trend of inclining to the upper right, as shown in FIG. 10. There may be another case that the X coordinate values of the color sub-pixel units decrease successively as the Y coordinate values of the color sub-pixel units increase successively. That is, from the first color sub-pixel unit to the n-th color sub-pixel unit, the X coordinate values of the color sub-pixel units may be shifted −M/(n−1) successively, i.e., the X coordinate values of the color sub-pixel units decrease successively as the Y coordinate values of the color sub-pixel units increase successively, so that one column of color sub-pixel units appear a trend of inclining to the lower right. Of course, for one column of color sub-pixel units, the variation trend of the Y coordinate values may have nothing to do with the variation trend of the X coordinate values, that is, one column of color sub-pixel units are arranged randomly in the Y-direction.

Figure 11:
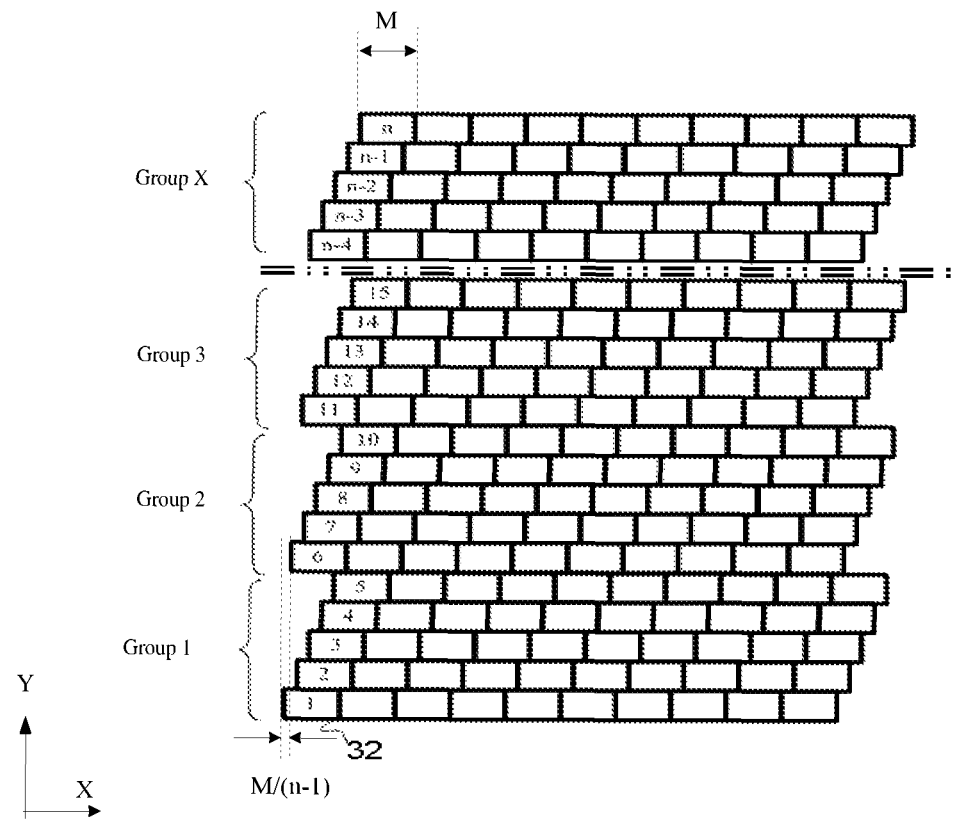
FIG. 11 is a schematic diagram showing a second implementation of the third embodiment.

Reference is made to FIG. 11, which is a schematic diagram showing a second implementation of the third embodiment. Each column of color sub-pixel units includes n color sub-pixel units. One column of color sub-pixel units are divided into multiple groups, such as group 1 to group X. The variation trends of the Y coordinate values are the same for the multiple groups of color sub-pixel units, and for the color sub-pixel units having a same order in the multiple groups, there is a difference M/(n−1) between the X coordinate values of the color sub-pixel units having the same order in every two adjacent groups, where M is the length of the color sub-pixel unit in the X-direction. With the technical solution in the second implementation, the difference between the X coordinate values of two adjacent color sub-pixel units are increased, so that the technical implementation is easier, and it is easier for the eyes to distinguish the pixel units, thereby improving the display effect and making the stereoscopic image display device applicable for a display device with high resolution.

The X coordinate value of each of the color sub-pixel units in one column is determined in the above manner, and the X coordinate values of all color sub-pixel units in one column are different. In the next column of color sub-pixel units, the X coordinate value of each color sub-pixel unit is obtained by adding M to the X coordinate value of a color sub-pixel unit that is in the previous column and in the same row as the color sub-pixel unit. The X coordinate values of the color sub-pixel units in all rows and columns are different.

A second black matrix is disposed between two adjacent columns of color sub-pixel units. For convenience of calculation, the length M of the color sub-pixel unit in the X-direction includes the length of one second black matrix 32 in the X-direction.

In the following, detailed illustration of a third implementation of the third embodiment is given. A stereoscopic image display device includes multiple color sub-pixel units arranged in rows and columns. Each column of color sub-pixel units includes n color sub-pixel units, the length of each color sub-pixel unit in the X-direction is M, and the length of each color sub-pixel unit in the Y-direction is H. In one column of color sub-pixel units, a lateral displacement $dis_x$ of the X coordinate value X' of a n'-th color sub-pixel unit with respect to the X coordinate value of a first color sub-pixel unit is determined by formula 2:

$$dis_x = M \times \{(H \times n' \times F \div M) - \text{Floor}(H \times n' \times F \div M)\}, \quad \text{formula 2}$$

where 1<n'<n,

F is a preset irrational number, and

Floor( ): is a rounding down function.

The X coordinate value for the first color sub-pixel unit may be set as 0, and the X coordinate values for color sub-pixel units in one column are calculated according to formula 2, which are all irrational numbers. Considering that the process precision is within 0.001 μm, the calculation value after being rounded to 3 or 2 decimal places may be set as an actual design value for the X coordinate. Among the X coordinate values of the color sub-pixel units that are obtained according to formula 2, there is no repetition in the calculation values or the actual values for the X coordinates. Therefore, the Moire fringes, resulted from the black matrixes for the multiple pixel units that are connected together, are avoided.

The third implementation just provides a method for calculating the X coordinate values of multiple color sub-pixel units in one column of color sub-pixel units, and is not meant to limit the method for arranging the color sub-pixel units.

The X coordinate value of each of the color sub-pixel units in one column is determined in the above manner, and the X coordinate values of all color sub-pixel units in one column are different. In the next column of color sub-pixel units, the X coordinate value of each color sub-pixel unit is obtained by adding M to the X coordinate value of a color sub-pixel unit that is in the previous column and in the same row as the color sub-pixel unit. The X coordinate values of the color sub-pixel units in all rows and columns are different.

A first black matrix is disposed between two adjacent rows of color sub-pixel units, and a second black matrix is disposed between two adjacent columns of color sub-pixel units. For convenience of calculation, the length H of the color sub-pixel unit in the Y-direction includes the length of one first black matrix in the Y-direction, and the length M of the color sub-pixel unit in the X-direction includes the length of one second black matrix in the X-direction.

Figure 12:
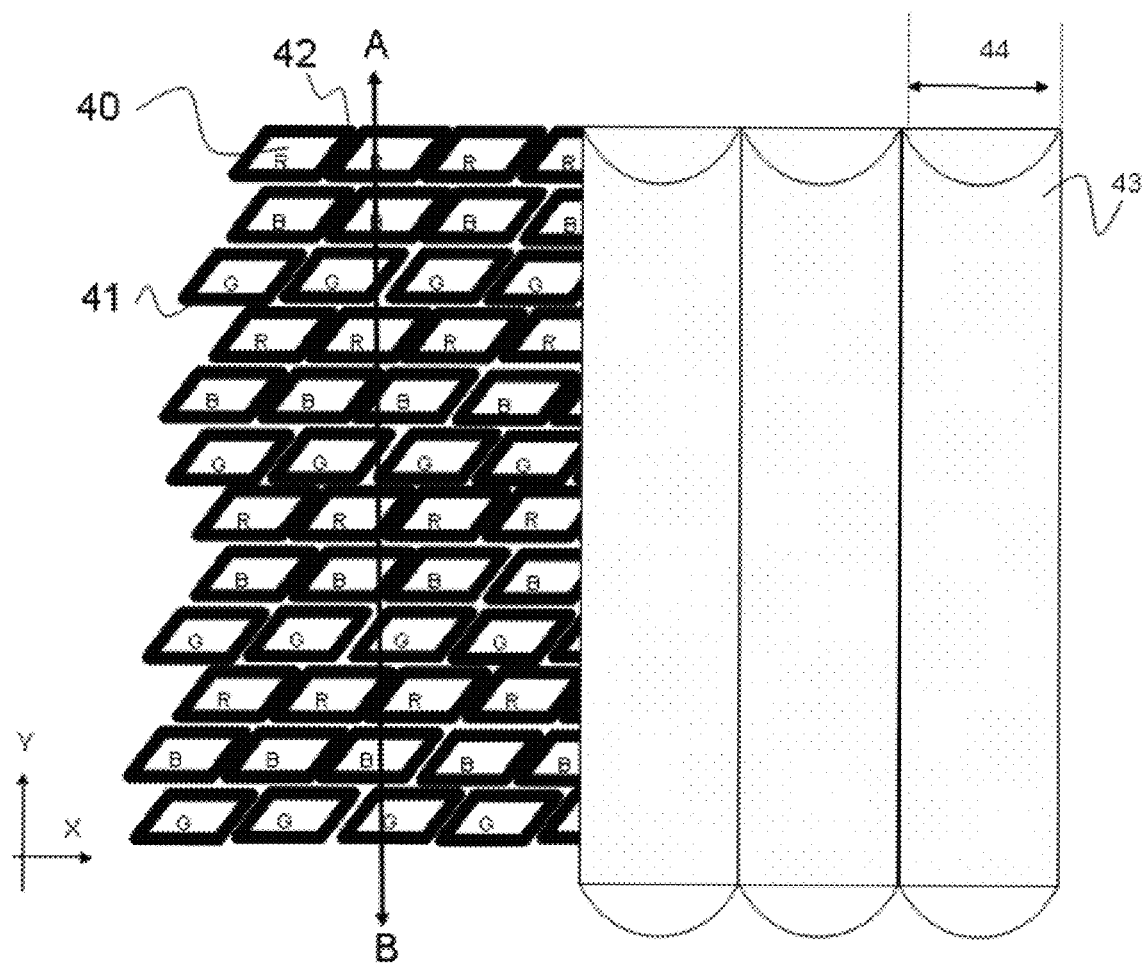
FIG. 12 shows a schematic diagram of a stereoscopic image display device according to a fourth embodiment.

FIG. 12 is a schematic diagram of a stereoscopic image display device according to a fourth embodiment. The stereoscopic image display device includes multiple color sub-pixel units 40. The multiple color sub-pixel units 40 include R sub-pixel units, G sub-pixel units, and B sub-pixel units, and the multiple color sub-pixel units 40 are arranged in rows and columns. A first black matrix 41 is disposed between adjacent rows of color sub-pixel units, and a second black matrix 42 is disposed between adjacent columns of color sub-pixel units. That is, in the fourth embodiment, the display unit is a color sub-pixel unit.

The color sub-pixel units 40 in one row have a same color, and the rows of color sub-pixel units that have different colors are alternatively arranged. Every two columns of color sub-pixel units correspond to one half-cylinder lens in the lens sheet, and the X coordinate values of respective color sub-pixel unit 40 in the two columns of color sub-pixel units do not repeat periodically.

The fourth embodiment differs from the third embodiment in that: the second black matrix 42 disposed between adjacent columns of color sub-pixel units is at an angle larger than 0 degree with respect to the direction of a long edge of the half-cylinder lens. As shown in the figure, the color sub-pixel unit 40 is in a shape of a parallelogram, an angle between every two adjacent edges of the parallelogram is not equal to 90 degrees, and one bottom edge of the parallelogram is set to be parallel to the X axis.

Conventionally, the stereoscopic image display device often generates Moire fringes. That is, the Moire fringes are generated in a case where a lens sheet and a 2D displayer cooperate to form a stereoscopic image display device. The Moire fringe is a kind of periodically repeated Mura, i.e., a periodic non-uniformity in display. The Moire fringes are mainly resulted from periodic repetition of the lens sheet and the black matrix stripes in the 2D display and from intersection between the lens sheet and the black matrixes. The observation to a stereoscopic image may suffer from the Moire fringes, or even be failed due to a serious case of the Moire fringes.

Figure 13:
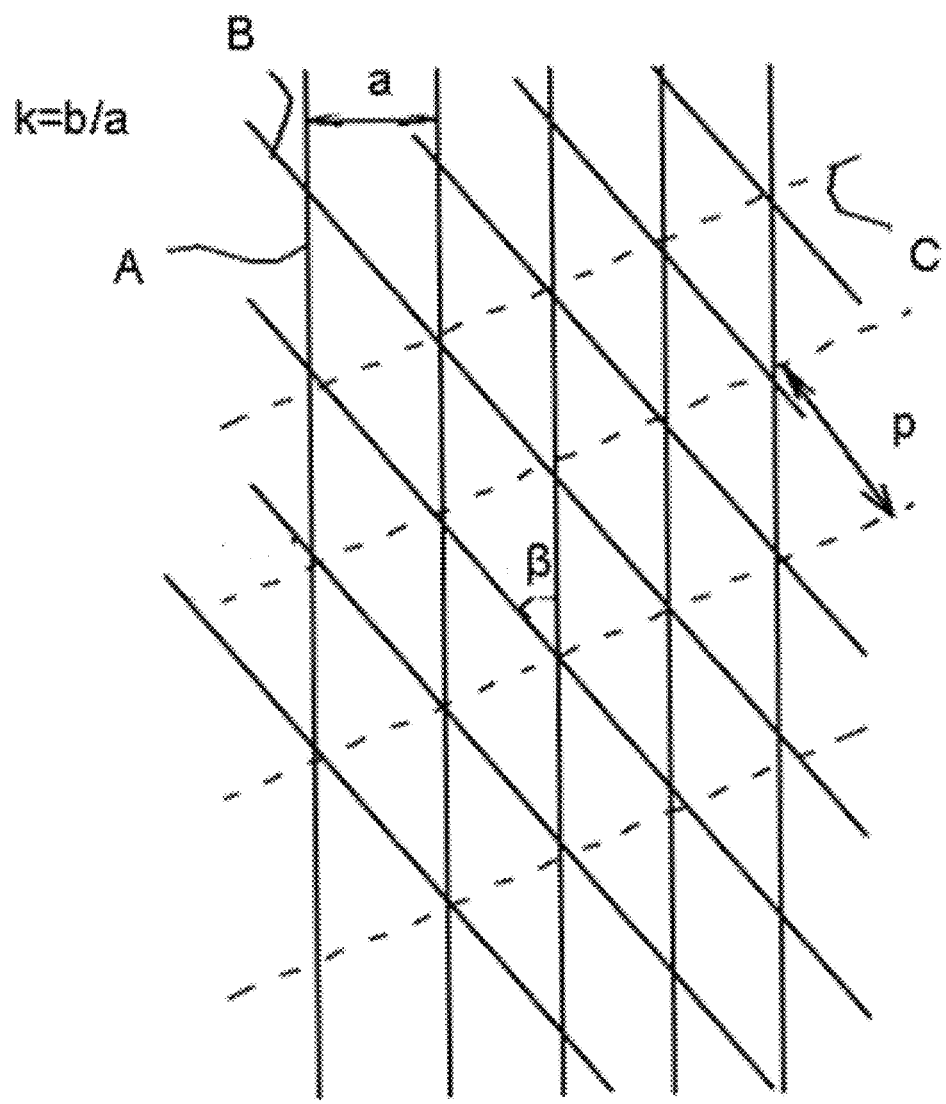
FIG. 13 is a schematic diagram showing the principle of generating Moire fringes.

In the following, the principle of generating Moire fringes is introduced in detail in conjunction with FIG. 13. As shown in FIG. 13, the stereoscopic image display device includes: multiple half-cylinder lenses A arranged in the Y-direction with a spacing of a, which is the cycle of the lenses; and multiple black matrix stripes B. The multiple black matrix stripes B may be in more than two directions, and the black matrix stripe B in each direction may interact with the half-cylinder lens A to generate a Moire fringe. In addition, since the Moire fringes are in different directions, different Moire fringes on the whole stereoscopic image display device may superimpose to influence the display effect. First, it is illustrated by taking a case that the black matrix stripes B are in the same direction as an example. There is an angle between each of the multiple black matrix stripes B and the half-cylinder lens A, and the cycle of the black matrix stripes B is b. The ratio of the spacing b for the black matrix stripes B to the spacing a for the half-cylinder lens is k.

Moire fringes C are generated due to regular repetition of the half-cylinder lenses A and the black matrix stripes B, and the spacing between the Moire fringes C is p. Accordingly, a visual effect of periodic non-uniformity is brought to the observer.

The spacing p between the Moire fringes may be calculated by formula 3:

$$p=|a\times k\div\cos\beta\div\{(\tan\beta)^2+(1-k\div(\cos\beta)^2)\}^{1/2}|$$ formula 3

Figure 14:
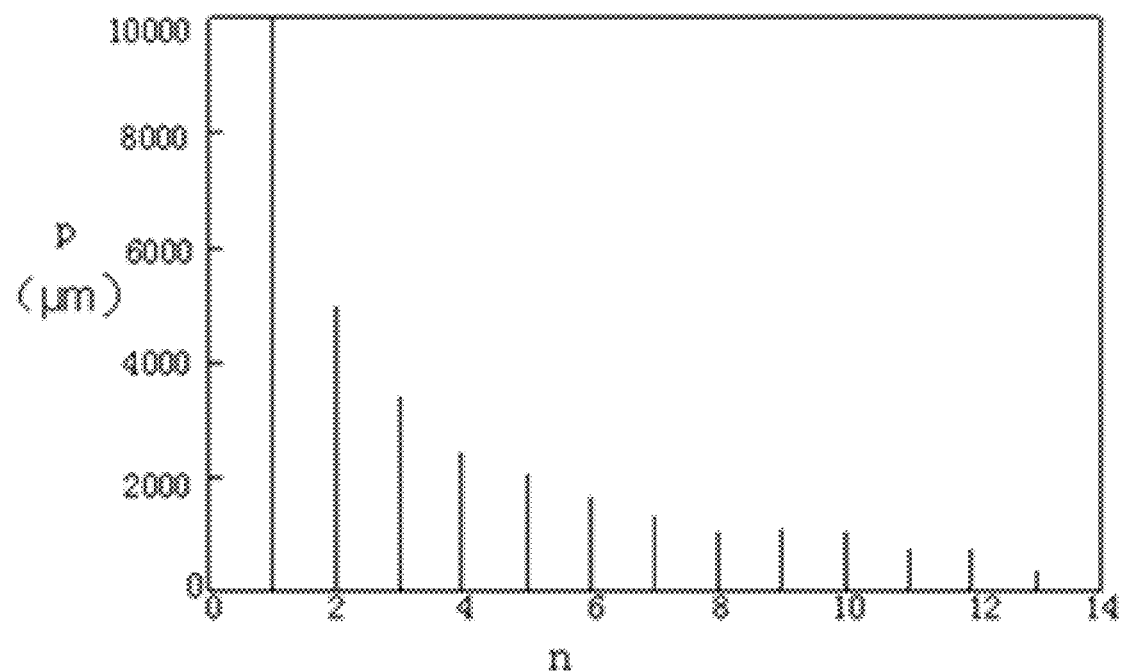
FIG. 14 is a schematic diagram showing variation of the spacing between the Moire fringes.

The inventor finds that: with reference to FIG. 14 which is a schematic diagram showing variation for the spacing between the Moire fringes, if the spacing p between the Moire fringes C becomes larger, the interference of the Moire fringes C to the observer of the stereoscopic image becomes larger, result in a failure of the observation to the stereoscopic image; however, in a case where the spacing p between the Moire fringes C is reduced, for example, to a size unidentifiable by the eyes, the influence of the Moire fringes on the observation may be reduced.

Figure 15:
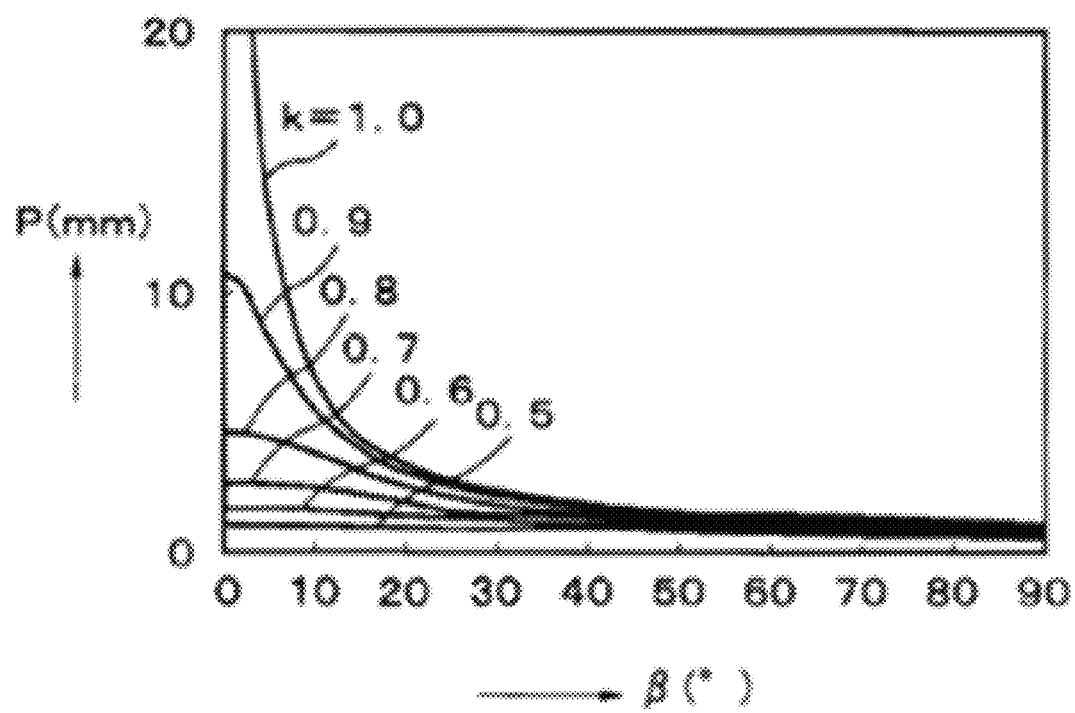
FIG. 15 is a schematic diagram showing a variation rule for the spacing between the Moire fringes.

Reference is made to FIG. 15, which is a schematic diagram showing a variation rule for the spacing p between the Mire fringes C according to experiments and tests. As shown in FIG. 15, in a case where the ratio k of the cycle b for the black matrix stripes B to the cycle a for the half-cylinder lenses A takes different values, the spacing p between Moire fringes varies as the angle β between the half-cylinder lens A and the black matrix stripe B varies. As shown in FIG. 15, given a certain value of k, the Moire fringe spacing p decreases as the angle β increases.

Therefore, the spacing between the Moire fringes can be reduced by setting the angle between the second black matrix 42, which is disposed between adjacent rows of color sub-pixel units, and the cycle direction of the lens sheet to be larger than 0 degree, thereby improving the display effect of the stereoscopic image display device.

Figure 16:
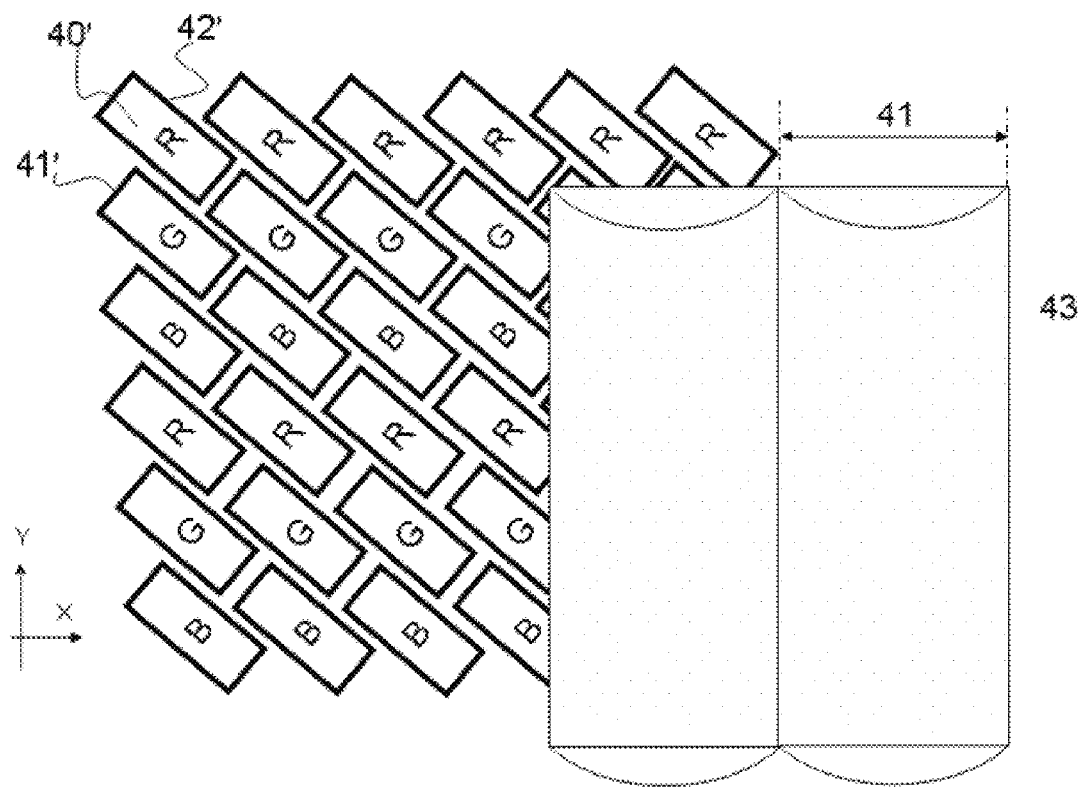
FIG. 16 is a schematic diagram showing another implementation of the fourth embodiment.

In the fourth embodiment, the color sub-pixel unit is in a shape of a parallelogram, for which every two adjacent edges form an angle other than 90 degrees. In other embodiments, the color sub-pixel unit may be in other shapes. Specifically, reference is made to FIG. 16, which is a schematic diagram showing another implementation of the fourth embodiment. As shown, this implementation differs from the fourth embodiment in that: the color sub-pixel unit 40' is in a shape of a rectangular and is inclined.

Specifically, the color sub-pixel unit 40' is in a shape of a rectangular, and is set to incline to the left. The color sub-pixel units in one row have a same color, and the rows of color sub-pixel units that have different colors are alternatively arranged. A first black matrix 41' is disposed between adjacent rows of color sub-pixel units, and a second black matrix 42' is disposed between adjacent columns of color sub-pixel units. The angle between the second black matrix 42' and the long edge of the half-cylinder lens 41 is larger than 0 degree since the color sub-pixel unit 40' is set to incline, hence the spacing between the Moire fringes can also be reduced, thereby improving the display effect of the stereoscopic image display device.

Figure 17:
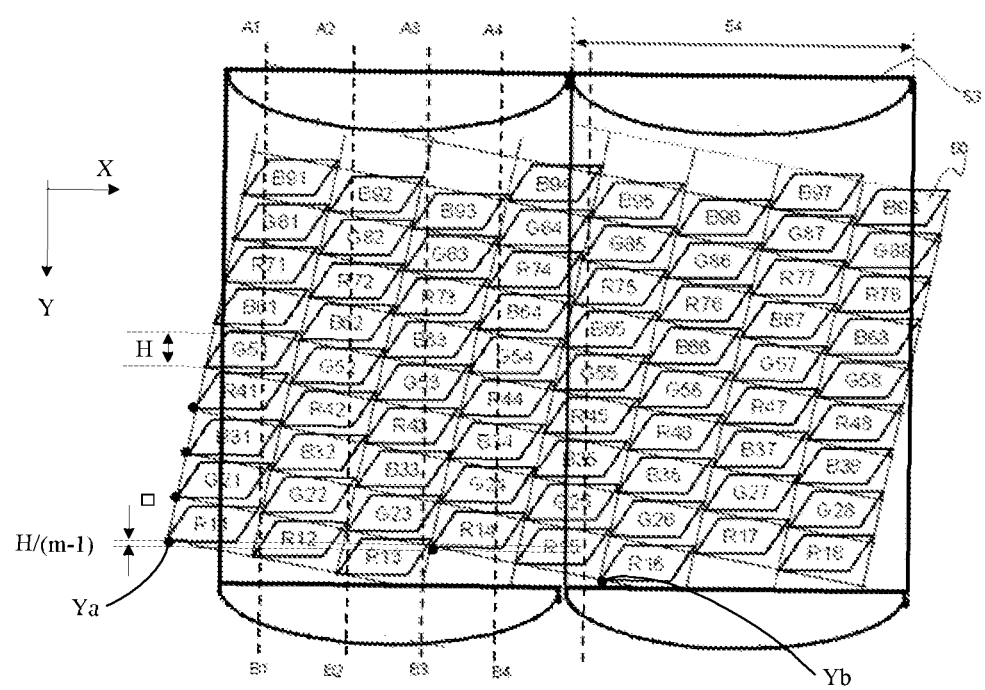
FIG. 17 shows a schematic diagram of a stereoscopic image display device according to a fifth embodiment.

FIG. 17 shows a schematic diagram of a stereoscopic image display device according to a fifth embodiment. The stereoscopic image display device includes multiple color sub-pixel units 50. Specifically, the multiple color sub-pixel units 50 include R sub-pixel units, G sub-pixel units, and B sub-pixel units. The multiple color sub-pixel units 50 are arranged in rows and columns. The color sub-pixel units 50 in one row have a same color, and the rows of color sub-pixel units that have different colors are alternatively arranged.

The stereoscopic image display device further includes a lens sheet 53 disposed corresponding to the multiple color sub-pixel units 50. The lens sheet 53 is formed by multiple lined up half-cylinder lenses 54. The lens sheet 53 is disposed between an observation point and the multiple color sub-pixel units 50. In the X-direction, one cycle of the lens sheet 53, i.e., the length of one half-cylinder lens 54, is twice of a cycle length of the color sub-pixel unit 50. That is, one cycle of the lens sheet 53 corresponds to two columns of color sub-pixel units 50, for providing an image to be observed by the left eye and an image to be observed by the right eye respectively. Within one cycle of the lens sheet 53, the X coordinate values of the color sub-pixel units 50 in the two columns do not repeat periodically. A second black matrix disposed between adjacent columns of color sub-pixel units forms an angle larger than 0 degree with respect to the direction of a long edge of the half-cylinder lens in the lens sheet. The above arrangements are the same as the arrangements in the fourth embodiment, but the embodiment differs from the fourth embodiment in that:

one row of color sub-pixel units includes m color sub-pixel units, and the length of each color sub-pixel unit in the Y-direction is H. For the multiple color sub-pixel units in one row, the Y coordinate values are different from each other, in which the minimum Y coordinate value is $Y_a$, the maximum Y coordinate value is $Y_b$, and $0 \leq Y_b - Y_a \leq H$.

Reference is made to FIG. 12, which shows one color sub-pixel unit matrix according to the fourth embodiment. In the color sub-pixel unit matrix, multiple R sub-pixel units, multiple G sub-pixel units and multiple B sub-pixel units are included, each row includes the color sub-pixel units having a same color, and the rows of color sub-pixel units that have different colors are alternatively arranged. Sight line AB indicates a picture saw by the eyes through a half-cylinder lens. As illustrated in the above description, in a case where a stereoscopic image display device is observed, a picture saw by the eyes equals to one viewpoint when the eyes see one pixel unit through one half-cylinder lens; and one sight line AB is formed after all the viewpoints from top to bottom within one half-cylinder lens are connected.

As can be seen from sight line AB, since the color sub-pixel unit is in a shape of a parallelogram and an angle between every two adjacent sides of the parallelogram is not equal to 90 degrees, the areas passed through by sight line AB in the color sub-pixel units are different, that is, the area observed by the eyes in one color sub-pixel unit is different from the other. Therefore, there may be a problem of color shift for the whole display device.

The stereoscopic image display device according to the fifth embodiment may solve the above problem of color shift. Specifically, reference is made to FIG. 17 once again, which shows an array of color sub-pixel units 50 that has 9 rows and 8 columns. The length of each color sub-pixel unit 50 in the X-direction is M, and the length of each color sub-pixel unit 50 in the Y-direction is H.

In the first column of color sub-pixel units 50, the color sub-pixel units 50 having three different colors, i.e., R sub-pixel units, G sub-pixel units and B sub-pixel units, are alternatively arranged. In addition, in the first column of color sub-pixel units 50, the X coordinate values at the same vertices of respective color sub-pixel units 50 are different, in which the minimum X coordinate value is x1, the maximum X coordinate value is X12, and 0≤x12−x1≤M. For the second column of color sub-pixel units to the twelfth column of color sub-pixel units, arrangements are similar to the arrangement for the first column of color sub-pixel units.

The first row of color sub-pixel units, called R row, includes 8 color sub-pixel units 50 that are from R11 to R18, and the Y coordinate values at the same vertices of the 8 color sub-pixel units are different from each other. Among the 8 color sub-pixel units 50, color sub-pixel unit R16 has the minimum Y coordinate value of $Y_{16}$, color sub-pixel unit R11 has the maximum Y coordinate value of $Y_{11}$, and $0 \leq Y_1 - Y_{16} \leq H$. That is, in one row of color sub-pixel units, the Y coordinate values of respective color sub-pixel units are shifted without exceeding the range of the length H of the first color sub-pixel unit R11.

Color sub-pixel unit R11, color sub-pixel unit G21 and color sub-pixel unit B31 form one pixel unit, and when sight line A1B1 is focused on the pixel unit formed by color sub-pixel unit R11, color sub-pixel unit G21 and color sub-pixel unit B31, the area passed through by sight line A1B1 in the color sub-pixel unit R11 and the area passed through by sight line A1B1 in the color sub-pixel unit G21 are small, therefore the pixel unit looks blueish. Color sub-pixel unit R12, color sub-pixel unit G22 and color sub-pixel unit B32 form one pixel unit, and when sight line A2B2 is focused on the pixel unit formed by color sub-pixel unit R12, color sub-pixel unit G22 and color sub-pixel unit B32, the pixel unit also looks blueish since the area passed through by sight line A2B2 in the color sub-pixel unit R12 and the area passed through by sight line A2B2 in the color sub-pixel unit G22 are small. However, for one pixel unit formed by color sub-pixel unit R13, color sub-pixel unit G23 and color sub-pixel unit B33, the area passed through by sight line A3B3 in the color sub-pixel unit G23 and the area passed through by sight line A3B3 in the color sub-pixel unit R13 increase, and the situation of blueish is improved. For one pixel unit formed by color sub-pixel unit R14, color sub-pixel unit G24 and color sub-pixel unit B34, the area passed through by sight line A4B4 in the color sub-pixel unit B34, the area passed through by sight line A4B4 in the color sub-pixel unit G24 and the area passed through by sight line A4B4 in the color sub-pixel unit R14 are the same, and the color of the picture is displayed normally. That is, a problem that the picture looks blueish is modified in the lateral direction, thereby avoiding the conventional problem that all the pixel units in one row look blueish in the lateral direction.

Similarly, for one pixel unit formed by color sub-pixel unit B93, color sub-pixel unit G83 and color sub-pixel unit R73, the area passed through by sight line A3B3 in the color sub-pixel unit B93 is small, the pixel unit looks reddish and greenish. However, for one pixel unit formed by color sub-pixel unit B92, color sub-pixel unit G82 and color sub-pixel unit R72, the area passed through by sight line A2B2 in the color sub-pixel unit B92 increases, improving the situation that the pixel unit looks reddish and greenish. For one pixel unit formed by color sub-pixel unit B91, color sub-pixel unit G81 and color sub-pixel unit R71, the area passed through by sight line A1B1 in the color sub-pixel unit B91 also increases, so that the pixel unit substantially has no color shift. That is, a problem that the picture looks reddish and greenish is modified in the lateral direction, thereby avoiding the conventional problem that all the pixel units in one row look reddish and greenish in the lateral direction.

In a case where the color sub-pixel unit is a parallelogram in which every two adjacent edges form an angle other than 90 degrees, the Y coordinate values of respective color sub-pixel units in one row are set to be different from each other, so that the observable area of the color sub-pixel units may be different when different sight lines pass through a same row of color sub-pixel units. In this way, a problem of color shift in one row of color sub-pixel units is avoided, thereby improving the display effect.

The arrangement of the color sub-pixel units in one column is the same as that shown in embodiments 1 to 4, which is not repeated here. There are many implementations for arranging the color sub-pixel units in the row direction, which will be illustrated hereinafter.

In the following, description of a first implementation of the fifth embodiment is set forth. A stereoscopic image display device includes multiple rows of color sub-pixel units. One row of color sub-pixel units includes m color sub-pixel units, and each of the m color sub-pixel units is a parallelogram in which every two adjacent edges form an angle other than 90 degrees. For the m color sub-pixel units, the Y coordinate values are different from each other, in which the minimum Y coordinate value is $Y_1$, the maximum Y coordinate value is $Y_n$, and $0 \leq Y_n - Y_1 \leq H$, where H is the length of one color sub-pixel unit in the Y-direction. Each row of color sub-pixel units are also divided into multiple groups, the variation trends of the Y coordinate values are the same for respective groups of color sub-pixel units. Specifically, for the groups of color sub-pixel units, there is a difference H/(m−1) between the Y coordinate values of the color sub-pixel units having the same order in every two adjacent groups.

Referring to FIG. 17, it is illustrated by taking a case that 8 color sub-pixel units in one row including color sub-pixel unit R11 to color sub-pixel unit R18 are divided into 3 groups as an example. The first group and the second group include 3 color sub-pixel units R respectively, and the third group includes 2 color sub-pixel units R. If the value of H is 70 μm, then H/(m−1) is 10 μm.

For the groups, there is a difference of 10 μm between the Y coordinate values of the color sub-pixel units R having the same order in every two adjacent groups. Assuming that the Y coordinate value of the first color sub-pixel unit R11 in the first group is 0, then the Y coordinate value of the first color sub-pixel unit R14 in the second group is 10 μm, the Y coordinate value of the first color sub-pixel unit R17 in the third group is 20 μm, and so on.

The variation trends of the Y coordinate values are the same for respective groups of color sub-pixel units R. If the Y coordinate values decrease as the X coordinate values increase for the first group of color sub-pixel units R, then all the three groups of color sub-pixel units R are set to incline to the lower right. The Y coordinate value of the second color sub-pixel unit R12 in the first group may be 30 μm, then the Y coordinate value of the second color sub-pixel unit R15 in the second group is 40 μm, and so on. The Y coordinate values of individual pixel units are calculated in the following Table 3.

TABLE 3

| First group | Y coordinate value | Second group | Y coordinate value | Third group | Y coordinate value |
|---|---|---|---|---|---|
| R11 | 0 | R14 | 10 | R17 | 20 |
| R12 | 30 | R15 | 40 | R18 | 50 |
| R13 | 60 | R16 | 70 | | |

For the second row of color sub-pixel units to the ninth row of color sub-pixel units, the Y coordinate of each color sub-pixel unit may be obtained by adding H to the Y coordinate value of a color sub-pixel unit that is in the previous row and in the same column as the color sub-pixel unit. Preferably, the length H of the color sub-pixel unit in the Y-direction includes the length of one first black matrix in the Y-direction, so as to facilitate calculation of the Y coordinate value of the color sub-pixel unit.

With the above arrangement, one row of color sub-pixel units are divided into multiple groups, and there is a difference of H/(m−1) between the Y coordinate values of the color sub-pixel units having the same order in every two adjacent groups. Therefore, the problem of color shift in the stereoscopic display device can be solved, thereby improving the display effect.

In the following, specific description of a second implementation of the fifth embodiment is given. A stereoscopic image display device includes multiple rows of color sub-pixel units, the length of the color sub-pixel unit in the Y-direction is H, and the length of the color sub-pixel unit in the X-direction is M. One row of color sub-pixel units includes m color sub-pixel units, and each of the m color sub-pixel units is a parallelogram in which every two adjacent edges form an angle other than 90 degrees. In one row of color sub-pixel units, a longitudinal displacement $dis_y$ of the Y coordinate value of an m'-th color sub-pixel unit with respect to the Y coordinate value of the first color sub-pixel unit is determined by formula 4:

$$dis_y = H \times \{(M \times m' \times F \div H) - \text{Floor}(M \times m' \times F \div H)\} \quad \text{formula 4}$$

where 1<m'≤m,

F is a preset irrational number, and

Floor( ): is a rounding down function.

According to formula 4, a longitudinal displacement of the Y coordinate value Y2 of the second color sub-pixel unit m2 with respect to the Y coordinate value Y1 of the first color sub-pixel unit is: $dis_y = H \times \{(M \times 2 \times F \div H) - \text{Floor}(M \times 2 \times F \div H)\}$.

Assuming that the value of M is 30 μm, H is 100 μm, and F is 0.08748866352 . . . , then: $dis_y = 100 \times \{(0.6 \times 0.08748866352 \ldots) - \text{Floor}(0.6 \times 0.08748866352 \ldots)\} = 5.2493198112 \ldots$ Since F is an irrational number, (M×m'×F÷H) is also an irrational number. Being a rounding down function, Floor(M×m'×F÷H) is an integer less than (M×m'×F÷H). Therefore, the difference obtained by subtracting Floor(M×m'×F÷H) from (M×m'×F÷H) is an irrational number less than 0, and the product obtained by multiplying the difference by 100 is still an irrational number and less than 100. That is, the Y coordinate value Y2 of the second color sub-pixel unit m2 is an irrational number less than 30, i.e., the value of the longitudinal displacement $dis_y$ of the Y coordinate value of the second color sub-pixel unit with respect to the Y coordinate value of the first color sub-pixel unit does not exceed the range of the length H of the one color sub-pixel unit in the Y-direction.

TABLE 4

| m' | calculation value for the Y coordinate | actual value for the Y coordinate |
|---|---|---|
| 1 | 0 | 0 |
| 2 | 5.2493198112 | 5.249 |
| 3 | 7.8739797168 | 7.874 |
| 4 | 10.498639622 | 10.499 |
| 5 | 13.123299528 | 13.123 |
| 6 | 15.747959434 | 15.748 |
| 7 | 18.372619339 | 18.373 |
| 8 | 20.997279245 | 20.997 |
| 9 | 23.62193915 | 23.622 |
| 10 | 26.246599056 | 26.247 |
| 11 | 28.871258962 | 28.871 |
| 12 | 31.495918867 | 31.496 |
| 13 | 34.120578773 | 34.121 |
| 14 | 36.745238678 | 36.745 |
| 15 | 39.369898584 | 39.370 |
| 16 | 41.99455849 | 41.995 |
| 17 | 44.619218395 | 44.619 |
| 18 | 47.243878301 | 47.244 |
| 19 | 49.868538206 | 49.869 |
| 20 | 52.493198112 | 52.493 |
| 21 | 55.117858018 | 55.118 |
| 22 | 57.742517923 | 57.743 |
| 23 | 60.367177829 | 60.367 |
| 24 | 62.991837734 | 62.992 |
| 25 | 65.61649764 | 65.616 |
| 26 | 68.241157546 | 68.241 |
| 27 | 70.865817451 | 70.866 |
| 28 | 73.490477357 | 73.490 |
| 29 | 76.115137262 | 76.115 |
| 30 | 78.739797168 | 78.740 |
| 31 | 81.364457074 | 81.364 |
| 32 | 83.989116979 | 83.989 |
| 33 | 86.613776885 | 86.614 |
| 34 | 89.23843679 | 89.238 |
| 35 | 91.863096696 | 91.863 |
| 36 | 94.487756602 | 94.488 |
| 37 | 97.112416507 | 97.112 |
| 38 | 99.737076413 | 99.737 |
| 39 | 2.3617363184 | 2.362 |
| 40 | 4.986396224 | 4.986 |
| 41 | 7.6110561296 | 7.611 |
| 42 | 10.235716035 | 10.236 |
| 43 | 12.860375941 | 12.860 |
| 44 | 15.485035846 | 15.485 |
| 45 | 18.109695752 | 18.110 |
| 46 | 20.734355658 | 20.734 |
| 47 | 23.359015563 | 23.359 |
| 48 | 25.983675469 | 25.984 |
| 49 | 28.608335374 | 28.608 |
| 50 | 31.23299528 | 31.233 |
| 51 | 31.23299528 | 31.233 |
| 52 | 33.857655186 | 33.858 |
| 53 | 36.482315091 | 36.482 |
| 54 | 39.106974997 | 39.107 |
| 55 | 41.731634902 | 41.732 |
| 56 | 44.356294808 | 44.356 |
| 57 | 46.980954714 | 46.981 |
| 58 | 49.605614619 | 49.606 |
| 59 | 52.230274525 | 52.230 |
| 60 | 54.85493443 | 54.855 |
| 61 | 57.479594336 | 57.480 |
| 62 | 60.104254242 | 60.104 |
| 63 | 62.728914147 | 62.729 |
| 64 | 65.353574053 | 65.354 |
| 65 | 67.978233958 | 67.978 |
| 66 | 70.602893864 | 70.603 |
| 67 | 73.22755377 | 73.228 |
| 68 | 75.852213675 | 75.852 |
| 69 | 78.476873581 | 78.477 |
| 70 | 81.101533486 | 81.102 |
| 71 | 83.726193392 | 83.726 |

TABLE 4-continued

| m' | calculation value for the Y coordinate | actual value for the Y coordinate |
|---|---|---|
| 72 | 86.350853298 | 86.351 |
| 73 | 88.975513203 | 88.976 |
| 74 | 91.600173109 | 91.600 |
| 75 | 94.224833014 | 94.225 |
| 76 | 96.84949292 | 96.849 |

In one row, if the Y coordinate value Y1 of the first color sub-pixel unit m1 is 0 μm, then the Y coordinate value Y2 of the second color sub-pixel unit m2 is 5.2493198112 . . . μm. Considering that the process precision is within 0.001 μm, the calculation value after being rounded to 3 or 2 decimal places may be set as an actual design value for the Y coordinate.

Table 4 shows the Y coordinate values of 76 color sub-pixel units, including color sub-pixel unit m1 to color sub-pixel unit m76, in one column that are calculated according to formula 4, in which the value of m1 is 0, and the coordinate value is in the unit of μm. As can be seen from Table 4, the calculation values of the Y coordinate values of the 76 color sub-pixel units are irrational numbers. Considering that the process precision is within 0.001 μm, the calculation value after being rounded to 3 or 2 decimal places may be set as an actual design value for the Y coordinate. In Table 4, the calculation value after being rounded to 3 decimal places is set as an actual design value for the Y coordinate.

The calculation result in Table 4 also shows that, among the 76 color sub-pixel units, for both the calculation value and the actual value for the Y coordinate, the offset of the Y coordinate value of each color sub-pixel unit with respect to the Y coordinate value of the first color sub-pixel unit does not exceed the length H of the color sub-pixel unit in the Y-direction, i.e., 100 μm.

In addition, the 76 color sub-pixel units may be divided into two groups based on a variation rule in which the Y coordinate values vary from small to large. The first color sub-pixel unit to the 38-th color sub-pixel unit form the first group, and the 39-th color sub-pixel unit to the 76-th color sub-pixel unit form the second group. For the first color sub-pixel unit to the 76-th in the first and the second groups, the Y coordinate values increase gradually as the X coordinate values increase gradually. That is, the variation trends of the Y coordinate values of the color sub-pixel units are the same for each group.

The Y coordinate value of each color sub-pixel unit in the first row is calculated in the above manner. For the following rows of color sub-pixel units, the Y coordinate value of each color sub-pixel unit in one row is obtained by adding H to the Y coordinate value of a color sub-pixel unit that is in the previous row and in the same column as the color sub-pixel unit. Preferably, the length H of the color sub-pixel unit in the Y-direction includes the length of one first black matrix in the Y-direction, so as to facilitate calculation of the Y coordinate value of the color sub-pixel unit.

With the above arrangement, the Y coordinate values of the color sub-pixel units in all rows and columns are different from each other, so that the problem of color shift in the stereoscopic display device can be solved, thereby improving the display effect.

In the fifth embodiment, the color sub-pixel unit is in a shape of a parallelogram in which every two adjacent edges form an angle other than 90 degrees. In other embodiments, the color sub-pixel unit may also be set to be in a shape of an inclined rectangular.

What is claimed is:

1. A stereoscopic image display device, comprising:
a plurality of display units arranged in rows and columns, a first black matrix being disposed between adjacent rows of display units, and a second black matrix being disposed between adjacent columns of display units; and
a lens sheet disposed corresponding to the plurality of display units, the lens sheet comprising a plurality of half-cylinder lenses arranged along an X-direction parallel to a row direction, and, in the X-direction, a cycle length of the lens sheet being a positive even multiple of a cycle length of the display units,
wherein X coordinate values and Y coordinate values of the plurality of display units are determined according to left lower vertexes of the display units, and a Y direction is parallel to a column direction, wherein
each column of display units comprises n display units, wherein n is greater than 3, and
in one column of display units,
a first display unit to n-th display unit are arranged along the Y direction, each of the first to n-th display units has a different X coordinate value, and a lateral displacement of an X coordinate value for at least one of third to n-th display units with respect to the X coordinate value of the first display unit is smaller than a lateral displacement of an X coordinate value of a second display unit with respect to the X coordinate value of the first display unit, wherein each display unit has a length of M in the X direction and a length of H in the Y direction, and the following relation is satisfied: $0 \leq X_b - X_a \leq M$,
wherein $X_a$ is a minimum X coordinate value for the display units in the column, and $X_b$ is a maximum X coordinate value for the display units in the column.

2. The stereoscopic image display device according to claim 1, wherein the length M of the display unit in the X-direction comprises a length of one second black matrix in the X-direction.

3. The stereoscopic image display device according to claim 1, wherein the length H of the display unit in the Y-direction comprises a length of one first black matrix in the Y-direction, and the length M of the display unit in the X-direction comprises a length of one second black matrix in the X-direction.

4. The stereoscopic image display device according to claim 1, wherein the display unit is a pixel unit, or the display unit is a color sub-pixel unit.

5. The stereoscopic image display device according to claim 4, wherein the second black matrix disposed between adjacent columns of color sub-pixel units is at an angle larger than 0 degree with respect to a long edge of the half-cylinder lens.

6. The stereoscopic image display device according to claim 4, wherein the color sub-pixel unit is in a shape of a diamond, or the color sub-pixel unit is in a shape of a rectangle.

7. The stereoscopic image display device according to claim 4, wherein:
individual color sub-pixel units in one row have a same color,
the rows of color sub-pixel units that have different colors are alternatively arranged, Y coordinate values of individual color sub-pixel units in one row of color sub-pixel units are different, and the following relation is satisfied: $0 \leq Y_b - Y_a \leq H$, where H is a length of each color sub-pixel unit in the Y-direction, $Y_a$ is a minimum Y coordinate value for color sub-pixel units in a row, and $Y_b$ is a maximum Y coordinate value for the color sub-pixel units in the row.

8. The stereoscopic image display device according to claim 7, wherein:

m color sub-pixel units in each row are divided into a plurality of groups each having a plurality of adjacent color sub-pixel units, and m is the number of color sub-pixel units in each row of display units, in each of the groups, a first color sub-pixel to m'-th color sub-pixel are arranged along X direction, wherein 1<m'<m, and among the plurality of groups, there is a difference of H/(m−1) between Y coordinate values of two color sub-pixels having a same ordinal position in every two adjacent groups.

9. The stereoscopic image display device according to claim 8, wherein, in each group of color sub-pixel units, the Y coordinate value of the color sub-pixel unit increases as the X coordinate value of the color sub-pixel unit increases, or the Y coordinate value of the color sub-pixel unit decreases as the X coordinate value of the color sub-pixel unit increases.

10. The stereoscopic image display device according to claim 8, wherein the length H of the color sub-pixel unit in the Y-direction comprises a length of one first black matrix in the Y-direction.

11. The stereoscopic image display device according to claim 7, wherein, for m color sub-pixel units in one row, a first color sub-pixel to m-th color sub-pixel are arranged along X direction, each of the first to m-th color sub-pixels has a different Y coordinate value, a lateral displacement of a Y coordinate value for at least one of third to m-th color sub-pixels with respect to the Y coordinate value of the first color sub-pixel is smaller than a lateral displacement of a Y coordinate value of a second sub-pixel with respect to the Y coordinate value of the first color sub-pixel, wherein m is greater than 3.

12. The stereoscopic image display device according to claim 11, wherein the length H of the color sub-pixel unit in the Y-direction comprises a length of one first black matrix in the Y-direction, and the length M of the color sub-pixel unit in the X-direction comprises a length of one second black matrix in the X-direction.

13. The stereoscopic image display device according to claim 1, wherein the n display units in the column are divided into a plurality of groups each having a plurality of adjacent display units, and a maximum lateral displacement of X coordinate values for display units in each group with respect to the X coordinate value of the first display unit is greater than a minimum lateral displacement of X coordinate values for display units in an adjacent group with respect to the X coordinate value of the first display unit.

* * * * *